US009367859B2

(12) United States Patent
Lueken

(10) Patent No.: US 9,367,859 B2
(45) Date of Patent: Jun. 14, 2016

(54) SYSTEMS AND METHODS FOR NEAR FIELD COMMUNICATION ENABLED SHOPPING CART CORRALS

(71) Applicant: Starlite Media, LLC, New York, NY (US)

(72) Inventor: Harold Lueken, New York, NY (US)

(73) Assignee: Starlite Media, LLC, New York, NY (US)

( * ) Notice: Subject to any disclaimer, the term of this patent is extended or adjusted under 35 U.S.C. 154(b) by 0 days.

(21) Appl. No.: 14/043,687

(22) Filed: Oct. 1, 2013

(65) Prior Publication Data

US 2014/0040033 A1 Feb. 6, 2014

Related U.S. Application Data

(63) Continuation-in-part of application No. 13/205,594, filed on Aug. 8, 2011, which is a continuation-in-part of application No. 29/357,739, filed on Mar. 16, 2010, now abandoned.

(51) Int. Cl.
*B62H 3/12* (2006.01)
*G06Q 30/02* (2012.01)
(Continued)

(52) U.S. Cl.
CPC .............. *G06Q 30/0261* (2013.01); *A47F 10/04* (2013.01); *B62H 3/00* (2013.01); *B62H 3/12* (2013.01)

(58) Field of Classification Search
CPC ............. B62H 3/12; B62H 3/00; A47F 10/04
USPC ......... 40/606.03, 606.13, 606.14; 211/17, 22; 256/25
See application file for complete search history.

(56) References Cited

U.S. PATENT DOCUMENTS

| D31,832 S | 11/1899 | Marcus |
|---|---|---|
| 1,927,997 A | 9/1933 | Weston |
| 2,165,724 A | 7/1939 | Le |

(Continued)

FOREIGN PATENT DOCUMENTS

| CA | 2848905 | 3/2013 |
|---|---|---|
| CN | 203054922 | 7/2013 |

(Continued)

OTHER PUBLICATIONS

RFID Technology [online], [retrieved Feb. 14, 2013]. Retrieved from the Internet: <URL: http://www.vorelco.com/services/rfid-technology>, 16 pages.

(Continued)

*Primary Examiner* — Syed A Islam
(74) *Attorney, Agent, or Firm* — Bryan Cave LLP

(57) ABSTRACT

Certain embodiments disclose a corral and enclosure defined by three members having an opening configured to hold one or more shopping carts and display one or more advertisements, with two substantially parallel walls of equal or different lengths and advertisement panels affixed on the walls, such that they can be staggered. The staggered arrangement of the at least two panels facilitates better visibility and allows the simultaneous viewing of at least two panels. The panel(s) may also include a near field communication component that is configured to execute a promotional function associated with an advertisement that is displayed by the corral. The promotional function may cause promotional content to be transferred to the mobile device.

22 Claims, 16 Drawing Sheets

(51) Int. Cl.
*A47F 10/04* (2006.01)
*B62H 3/00* (2006.01)

(56) References Cited

U.S. PATENT DOCUMENTS

| | | | |
|---|---|---|---|
| 2,985,316 A | 5/1961 | Ruhnke | |
| 3,323,655 A | 6/1967 | Foran et al. | |
| D219,946 S | 2/1971 | Birnberg | |
| 3,722,702 A | 3/1973 | Marker, Jr. | |
| 4,236,697 A | 12/1980 | Savino | |
| 4,292,352 A | 9/1981 | Singer | |
| 4,364,192 A | 12/1982 | Lloyd | |
| D269,978 S | 8/1983 | Dickson | |
| 4,609,183 A | 9/1986 | Ulmer | |
| D286,074 S | 10/1986 | Corte | |
| 4,777,750 A | 10/1988 | Garfinkle | |
| 4,884,353 A | 12/1989 | Taylor | |
| 4,918,878 A | 4/1990 | Paschke et al. | |
| 4,957,256 A | 9/1990 | Boeding | |
| D321,798 S | 11/1991 | Buckley | |
| 5,082,087 A | 1/1992 | Hubbell | |
| D334,301 S | 3/1993 | Buckley | |
| 5,201,426 A | 4/1993 | Cruwell | |
| 5,220,740 A | 6/1993 | Brault | |
| 5,279,085 A | 1/1994 | DiPaolo et al. | |
| D350,038 S | 8/1994 | Buckley | |
| D361,448 S | 8/1995 | Buckley | |
| 5,551,578 A | 9/1996 | McCue et al. | |
| D376,854 S | 12/1996 | DiPaolo et al. | |
| 5,626,926 A | 5/1997 | Roberts | |
| 5,708,782 A | 1/1998 | Larson et al. | |
| 5,862,921 A | 1/1999 | Venegas | |
| 5,875,578 A | 3/1999 | Grewe | |
| 5,878,518 A | 3/1999 | Grewe | |
| 6,298,997 B1* | 10/2001 | Jarrett et al. | 211/17 |
| 6,449,888 B1 | 9/2002 | Gibbs | |
| 6,493,997 B2 | 12/2002 | Cohen | |
| 6,581,616 B1 | 6/2003 | Venegas | |
| D488,904 S | 4/2004 | Unnerstall et al. | |
| D492,732 S | 7/2004 | Herbst | |
| D495,011 S | 8/2004 | Trubiano | |
| D497,167 S | 10/2004 | Ozolins et al. | |
| 6,975,205 B1 | 12/2005 | French et al. | |
| 7,044,446 B2 | 5/2006 | Hempen et al. | |
| 7,140,581 B1 | 11/2006 | White | |
| D537,952 S | 3/2007 | Anton | |
| D540,472 S | 4/2007 | Van Es | |
| 7,210,270 B1 | 5/2007 | King et al. | |
| 7,237,360 B2 | 7/2007 | Moncho et al. | |
| 7,283,650 B1 | 10/2007 | Sharma et al. | |
| D587,761 S | 3/2009 | Grimshaw | |
| D588,201 S | 3/2009 | Kohagen et al. | |
| 7,660,747 B2 | 2/2010 | Brice et al. | |
| D615,129 S | 5/2010 | Allen | |
| D620,531 S | 7/2010 | Allen | |
| 7,894,936 B2 | 2/2011 | Walker et al. | |
| 7,895,782 B2 | 3/2011 | Farrell | |
| 8,015,737 B2 | 9/2011 | Venegas, Jr. | |
| 8,104,671 B2 | 1/2012 | Besecker et al. | |
| D653,709 S | 2/2012 | Allen | |
| RE43,233 E | 3/2012 | Venegas, Jr. | |
| 8,205,757 B2 | 6/2012 | Allen | |
| D663,779 S | 7/2012 | Lueken | |
| D667,504 S | 9/2012 | Allen | |
| 8,332,272 B2 | 12/2012 | Fisher | |
| 8,424,690 B2 | 4/2013 | Allen | |
| D682,944 S | 5/2013 | Lueken | |
| D695,835 S | 12/2013 | Lueken | |
| D695,836 S | 12/2013 | Lueken | |
| D695,837 S | 12/2013 | Lueken | |
| D699,789 S | 2/2014 | Allen | |
| D701,322 S | 3/2014 | McCue et al. | |
| D703,271 S | 4/2014 | Lueken | |
| D725,287 S | 3/2015 | Allen | |

| | | | |
|---|---|---|---|
| 2003/0115096 A1* | 6/2003 | Reynolds et al. | 705/14 |
| 2004/0079934 A1 | 4/2004 | Hempen et al. | |
| 2004/0225560 A1 | 11/2004 | Lewis et al. | |
| 2005/0083465 A1 | 4/2005 | Niiyama et al. | |
| 2006/0074769 A1* | 4/2006 | Looney | G06Q 30/02 705/14.66 |
| 2008/0040962 A1 | 2/2008 | Gurren | |
| 2008/0120877 A1 | 5/2008 | Farrell | |
| 2008/0185888 A1 | 8/2008 | Beall et al. | |
| 2008/0262928 A1* | 10/2008 | Michaelis | 705/14 |
| 2009/0288012 A1 | 11/2009 | Hertel et al. | |
| 2010/0114683 A1 | 5/2010 | Wessels et al. | |
| 2010/0327245 A1 | 12/2010 | Allen | |
| 2011/0047023 A1 | 2/2011 | Lieblang et al. | |
| 2011/0185607 A1* | 8/2011 | Forster et al. | 40/452 |
| 2011/0218942 A1 | 9/2011 | Scheffer | |
| 2012/0029998 A1 | 2/2012 | Aversano et al. | |
| 2012/0066068 A1 | 3/2012 | Pan | |
| 2012/0123826 A1 | 5/2012 | French et al. | |
| 2012/0209686 A1 | 8/2012 | Horowitz et al. | |
| 2012/0271715 A1 | 10/2012 | Morton et al. | |
| 2013/0085835 A1 | 4/2013 | Horowitz | |
| 2013/0090999 A1 | 4/2013 | Lellouche | |
| 2013/0091002 A1 | 4/2013 | Christie et al. | |
| 2013/0159090 A1 | 6/2013 | Boal | |
| 2013/0204697 A1 | 8/2013 | Boal | |
| 2013/0332253 A1 | 12/2013 | Shiffert et al. | |
| 2013/0332258 A1 | 12/2013 | Shiffert et al. | |
| 2013/0332274 A1 | 12/2013 | Faith et al. | |
| 2013/0332283 A1 | 12/2013 | Faith et al. | |
| 2014/0108108 A1 | 4/2014 | Artman et al. | |

FOREIGN PATENT DOCUMENTS

| | | |
|---|---|---|
| EP | 2273444 | 1/2011 |
| EP | 2487875 | 8/2012 |
| WO | WO 2013/040591 | 3/2013 |
| WO | WO 2013/126894 | 8/2013 |

OTHER PUBLICATIONS

Thinaire Launches the First Ever NFC Enterprise Marketing Platform [online], Sep. 12, 2012, [retrieved Jul. 31, 2014]. Retrieved from the Internet <URL: http://globenewswire.com/news-release/2012/09/12/490308/10004878/en/Thinaire-TM-Launches-the-First-Ever-NFC-Enterprise-Marketing-Platform.html>.

Kraft NFC pilot delivers 12 times the engagement level of QR codes [online], Oct. 18, 2012, [retrieved Jul. 31, 2014]. Retrieved from the Internet <URL: http://www.mobilecommercedaily.com/kraft-nfc-pilot-delivers-12-times-the-engagement-level-of-qr-codes>.

Valassis Launches Electronic Coupon Clearing Platform [online], Oct. 20, 2011, [retrieved Jul. 31, 2014]. Retrieved from the Internet <URL: http://news.thomasnet.com/fullstory/Coupon-Redemption-Software-performs-real-time-validation-604347>.

RFID-Enabled Cart Set to Provide Shoppers With Product Info, Ads [online], Jan. 31, 2007, [retrieved Jul. 31, 2014]. Retrieved from the Internet <URL: http://rfidjournal.com/articles/view?3013>.

Meijer's Smart Carts [online], Nov. 8, 206, [retrieved Jul. 31, 2014]. Retrieved from the Internet <URL: http://www.retailwire.com/discussion/11786/meijers-smart-carts.

Store logistics and payment with NFC [online], Jul. 1, 2006, [retrieved Jul. 31, 2014]. Retrieved from the Internet <URL: http://www.ist-world.org/ProjectDetails.aspx?ProjectId=e89323fb585a4b798bf211f044c71b54&SourceDatabaseId=7cff9226e582440894200b751bab883f>.

Stop & Shop, Scan It! & Scan It! Mobile [online], [retrieved Aug. 1, 2014]. Retrieved from the Internet <URL: http://www.stopandshop.com/scanitmobile>.

Brand.net brochure, Mobile Ads: Any Device / Instant Action.

Stop and Shop, Login [online], [retrieved Aug. 1, 2014]. Retrieved from the Internet <URL: https://www.stopandshop.com/login/?_requestid=88655>.

* cited by examiner

SYSTEMS AND METHODS FOR NEAR FIELD COMMUNICATION ENABLED SHOPPING CART CORRALS

CROSS-REFERENCE TO RELATED APPLICATION

This application is a continuation-in-part of U.S. patent application Ser. No. 13/205,594, filed Aug. 8, 2011, which is a continuation in part of U.S. patent application Ser. No. 29/357,739, filed Mar. 16, 2010, the contents of which are hereby incorporated by reference in their entirety.

FIELD OF THE INVENTION

This invention relates generally to shopping cart corrals that are enabled to communicate using near field technology and that have at least two walls (otherwise referred to as a "side" or "member") of equal or different lengths where at least two advertisement panels can be affixed in a parallel or staggered fashion, and the method for providing the same.

DESCRIPTION OF THE BACKGROUND

Businesses provide facilities to allow their customers to have a better experience or shop more comfortably. For example, many stores provide shopping carts for their customers to allow the customers to transport merchandise in their stores and to their vehicles. Stores also provide shopping cart corrals in their parking lots so the stores' customers can return the shopping carts after the customers have transported any purchased merchandise to their vehicles. Providing shopping cart corrals reduces vehicle damage complaints by customers by supplying the customers with a location to return their shopping carts, instead of the customers leaving the shopping carts in unoccupied parking spaces in the stores' parking lots. Shopping carts left in unoccupied parking spaces are more likely to roll (or to be accidentally pushed) into a vehicle parked in the parking lot and cause damage to the body or paint of the vehicle, as well as damage the cart. Shopping cart corrals also help keep parking lots organized and reduce shopping cart theft and loss. For similar reasons, airports provide luggage carts for travelers and businesses provide bicycle racks for their customers.

Other structures such as train or bus stop shelters provide customers comfort and protection from the elements while waiting for their transportation. Similarly, telephone booths provide customers comfort, protection and privacy while they make telephone calls.

While these structures and facilities can save the businesses money by reducing shopping and luggage cart loss and claims of vehicle damage, and enhance the customers' experience by avoiding clutters of carts and bicycles outside the stores, and in the case of train or bus stop shelters and telephone booths, by providing them with comfort, protection and privacy, these structures and facilities are expensive to purchase and maintain, and provide no direct revenues to the businesses.

Furthermore, these structures and facilities can become worn-out and battered after being exposed to the elements over an extended period of time. These worn-out and battered structures and facilities can be a blemish or eyesore at the front of an otherwise pristine and/or well-maintained business, particularly because they are often located in high traffic areas.

Many of these structures and facilities are constructed with a space created by two aligned walls of equal length where carts and bicycles can be held, or within which customers can stand or sit in the case of train or bus stop shelters and telephone booths (the space is hereinafter referred to as the "enclosure"). Advertisement panels may be affixed on the walls of these structures and facilities, and each panel has two sides, one facing the enclosure, and one facing away from it, both of which can display various advertisements simultaneously. These advertisements generate on-going revenues for the businesses and also make the structures and facilities more attractive.

Examples of shopping cart corrals having aligned walls on which advertisement panels are affixed are shown in U.S. patent application Ser. No. 12/456,875, filed Jun. 24, 2009, the contents of which are hereby incorporated by reference in their entirety.

However, the aligned advertisement panels prevent customers from viewing both panels simultaneously and also from viewing one of the panels in an unobstructed fashion in the event that an object such as a vehicle is parked alongside the panel, when customers approach from the side of the structure or facility, as discussed in more detail below in connection with FIG. 3A.

Accordingly, a need or potential for benefit exists for a facility or structure with at least two substantially parallel advertisement panels arranged in a staggered fashion to enhance visibility and allow simultaneous viewing of as many advertisements as possible on the two substantially parallel panels.

Existing shopping cart corrals fail to effectively advertise products and services for a number of other reasons as well. Over the course of the past two decades, the number of users who own mobile devices (e.g., cell phones, personal digital assistants, tablets or similar types of portable electronic devices) has steadily increased and the mobile devices have become much more powerful in terms of processing power, storage and functionality. Many mobile devices can store several gigabits worth of data and can perform a variety of different of functions, including functions for executing applications, downloading applications and content, and rendering web content. These mobile devices may also be configured to communicate using several different modes of communication (e.g., Bluetooth™, Wi-Fi, near field communication protocols, in addition to cellular networks). Despite the increased use and functionality of mobile devices, advertising or promotional campaigns that make use of shopping cart corrals fail to take advantage of opportunities that are presented or made available by mobile devices.

Moreover, with shopping cart corrals, the advertisements which are typically displayed tend to be made of paper, cardboard, metal or similar material. The advertisements are not interactive and do not provide any enhanced functionality that entices individuals to purchase the products or services which are being advertised. Individuals who view the advertisements may find them unappealing or pay little attention to the advertisements. Furthermore, from the perspective of an advertiser or advertisement service provider, changing such advertisements can be costly and time intensive given that the advertisements would have to be physically changed.

Accordingly, a need exists for providing a shopping cart corral, or other type of corral, that has the ability to advertise products and services in a manner which takes advantage of functionality provided by mobile devices such as smart phones. Likewise, a need exists for providing a shopping cart corral that is configured to provide interactive, tailored advertisements and promotions that can be dynamically changed over a network connection.

BRIEF SUMMARY OF THE INVENTION

In accordance with certain embodiments of the present invention, a corral may be provided which includes an enclosure defined by three members. The enclosure may have an opening configured to hold one or more shopping carts and display one or more advertisements, with two substantially parallel walls of different lengths and advertisement panels affixed on the walls. The advertisement panels may be staggered. The staggered arrangement of the at least two advertisement panels facilitates better visibility and allows the simultaneous viewing of at least two advertisement panels. The corral may also include a near field communication component that is configured to execute a promotional function associated with an advertisement that is displayed through the panels in the corral. The promotional function may cause promotional content to be transferred to the mobile device.

In accordance with certain embodiments of the present invention, a corral is configured to hold one or more shopping carts and display one or more advertisements. The corral includes an enclosure having an opening configured to receive the one or more shopping carts and at least one advertisement panel configured to display one or more advertisements. The corral further includes a near field communication component that is integrated into the corral. The near field communication component is configured to establish a connection with a mobile device in response to the mobile device being placed in proximity to the near field communication component, and to communicate with the mobile device via the established connection. The near field communication component is further configured to execute a promotional function for a product or service offered for sale by a business located in the vicinity of the corral. The promotional function may cause promotional content associated with the advertisement to be transferred to the mobile device. The promotional content can be utilized to obtain the product or service for a discounted price at the business.

These and other features and advantages will become apparent from the following detailed description of illustrative embodiments thereof, which is to be read in connection with the accompanying drawings.

BRIEF DESCRIPTION OF THE DRAWINGS

To facilitate further description of the embodiments, the following drawings are provided in which.

Figure 1A:
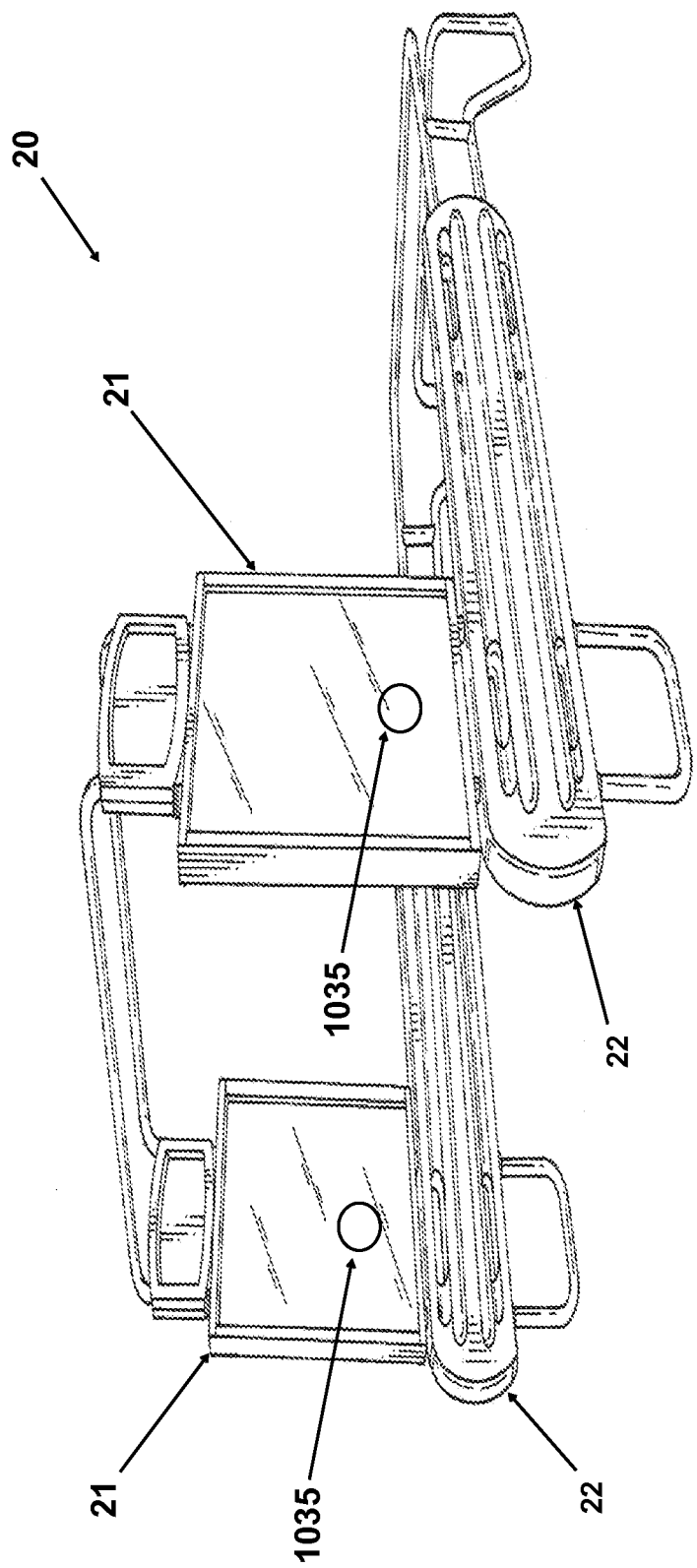
FIG. 1A illustrates a perspective view of a NFC-enabled shopping cart corral having two substantially parallel walls of equal length in accordance with certain embodiments of the present invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of certain embodiments of the present invention. The same reference numerals in different figures denote the same elements.

DETAILED DESCRIPTION OF THE INVENTION

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have" and any variations thereof, are intended to cover a non-exclusive inclusion, such that a process, method, system, article, device, corral or apparatus that comprises a list of elements is not necessarily limited to those elements, but may include other elements not expressly listed or inherent to such process, method, system, article, device, corral or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise either directly or indirectly. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled; and two or more mechanical elements may be electrically coupled, but not be mechanically or otherwise coupled. Coupling may be for any length of time, e.g., permanent or semi-permanent or only for an instant.

The absence of the word "removably," "removable," and the like near the word "coupled," and the like does not mean that the coupling, etc. in question is or is not removable.

In accordance with certain embodiments, a shopping cart corral is provided with at least two substantially parallel members that are equal in length and have advertisement panels mounted thereon. The corral can include: (a) an enclosure having an opening configured to receive one or more shopping carts, the enclosure having a first member that is equal in length to the member opposite the first; (b) at least one first panel located at the first member and configured to display at least a first advertisement; (c) at least one second panel located at the member opposite the first member and configured to display at least a second advertisement. The panels, advertisements or other portions of the corral may include a component that enables near field communication (NFC) with a mobile device or other device.

In accordance with certain embodiments, a shopping cart corral is provided with at least two substantially parallel members that differ in length so that any advertisement panels mounted thereon are staggered. The corral can include: (a) an enclosure having an opening configured to receive one or more shopping carts, the enclosure having a first member that is longer than the member opposite the first; (b) at least one first panel located at the first member and configured to display at least a first advertisement of the one or more advertisements; (c) at least one second panel located at the shorter member opposite the first member and configured to display at least a second advertisement of the one or more advertisements. The panels, advertisements or other portions of the corral may include a component that enables NFC with a mobile device or other device.

Advertisement panels are coupled adjacent to the opening of the shopping cart corral enclosure. Locating the panels in such a manner improves visibility of the panels when vehicles are parked near the corrals, and allows the simultaneous viewing of at least two advertisement panels. In embodiments that include members that differ in length, the longer member also further protects vehicles parked on its side from colliding with shopping carts.

The advertisement panels can be configured to hold one or more advertisements that improve the aesthetics of the parking lot and provide visibility in parking lots. Through such increased visibility, customers are able to learn more about products and services of interest, and advertisers are able to make additional commercial impressions in high-traffic areas. In addition, the shopping cart corrals can be used as a revenue stream for the owners of the parking lots, stores and/or corrals.

The panels and/or advertisements may include a NFC component that is configured to interact with a mobile device (or other NFC-enabled device) and to perform one or more promotional functions. Exemplary promotional functions may include transferring data (e.g., coupons, promotions or applications) to the mobile device, executing applications on the mobile device (e.g., launching web browsers to display information about products and services or launching an application store to download an application), updating loyalty card information for a customer or other individual, establishing a connection with an available network (e.g., connect to a Bluetooth™ or Wi-Fi network in the vicinity of the corral), subscribing to a mailing list, sending text messages or e-mails (e.g., sending text messages or e-mails that include promotional content), receiving or processing a payment, or interacting with a social media application or website.

In certain embodiments, an apparatus for retaining two or more shopping carts is provided. The apparatus can include: (a) a first member with a first end and a second end opposite the first end, the first member having at least one first advertisement panel configured to display at least one first advertisement; (b) a second member with a first end and a second end opposite the first end, the first end of the second member coupled to the second end of the first member; and (c) a third member that is shorter than the first member with a first end and a second end opposite the first end, the second end of the third member coupled to the second end of the second member. The first member is spaced apart from the third member such that two or more shopping carts can be placed between the first member, the second member, and the third member. The panels, advertisements or other portions of the corral may include a component that enables NFC with a mobile device or other device.

The discussion that follows initially describes exemplary structures for NFC-enabled corrals, as well as methods for providing the structures, with reference to FIGS. 1-9. Further details regarding the functionality and advantages provided by the NFC component of the corrals is then provided with reference to FIGS. 10-14.

Figure 1B:
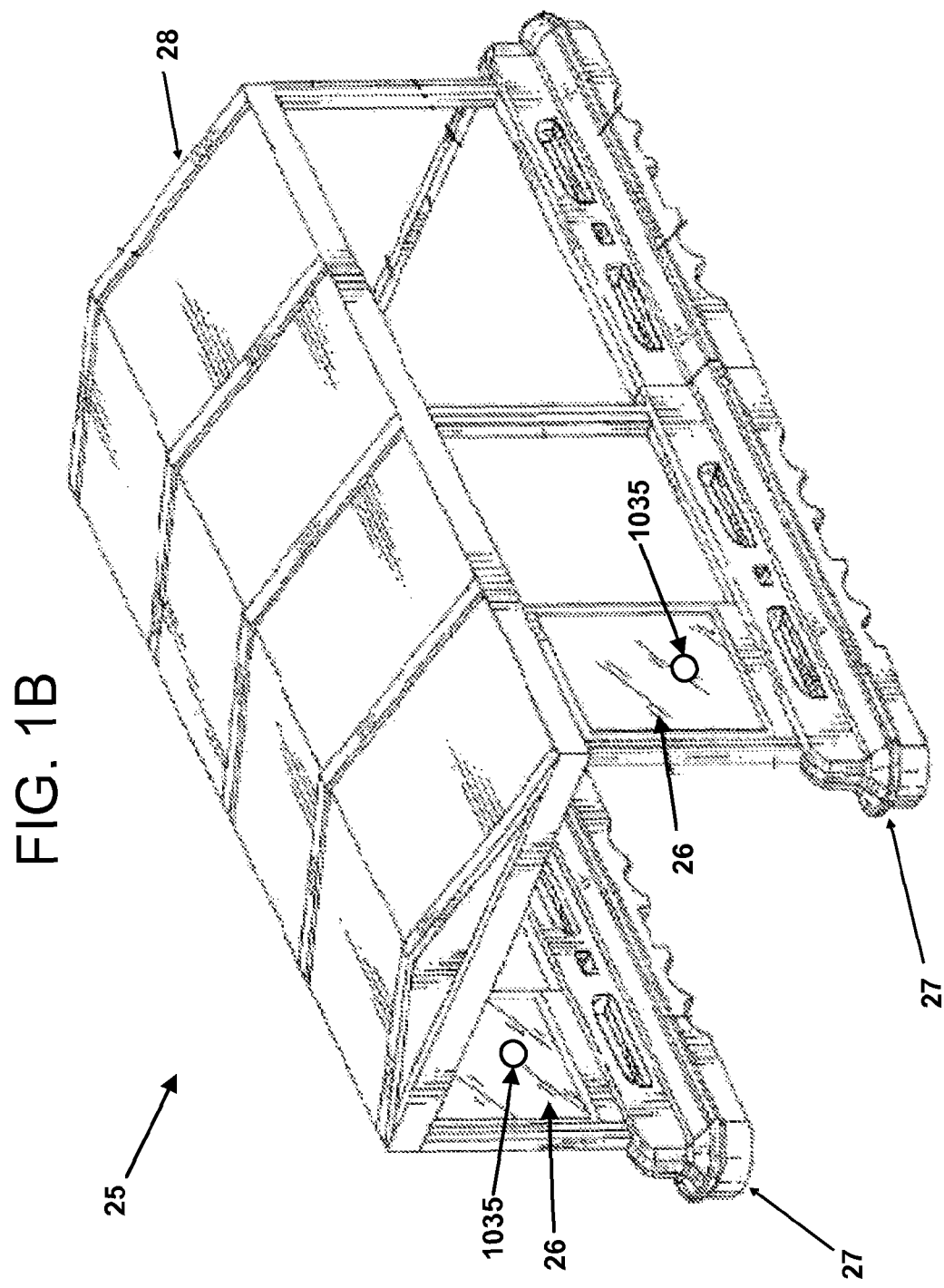
FIG. 1B illustrates a perspective view of a NFC-enabled shopping cart corral that includes an enclosure and two substantially parallel walls of equal length in accordance with certain embodiments of the present invention.
Figure 2:
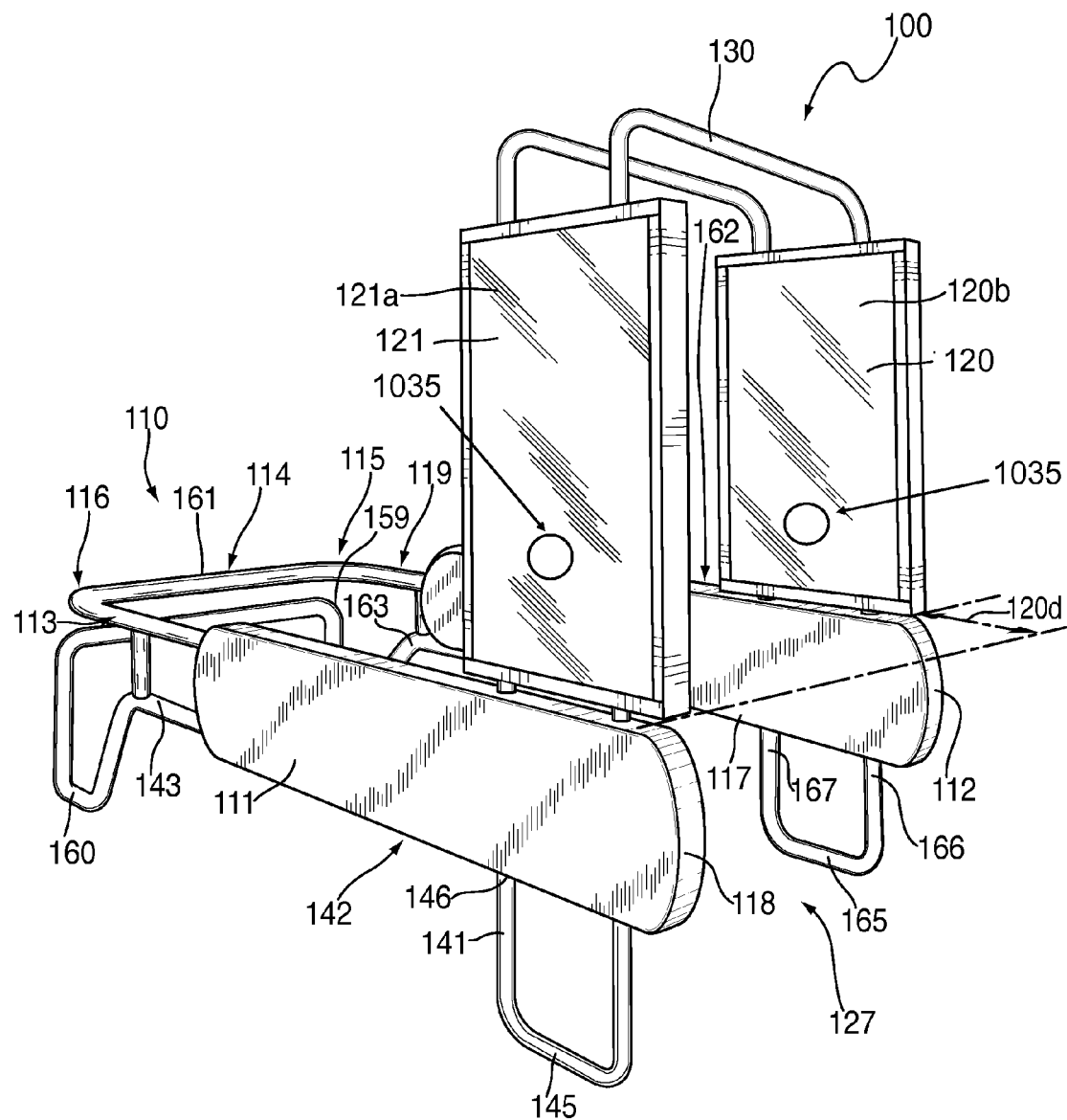
FIG. 2 illustrates a perspective view of a NFC-enabled shopping cart corral with two substantially parallel walls that differ in length and two staggered advertisement panels affixed thereon, according to certain embodiments.
Figure 3A:
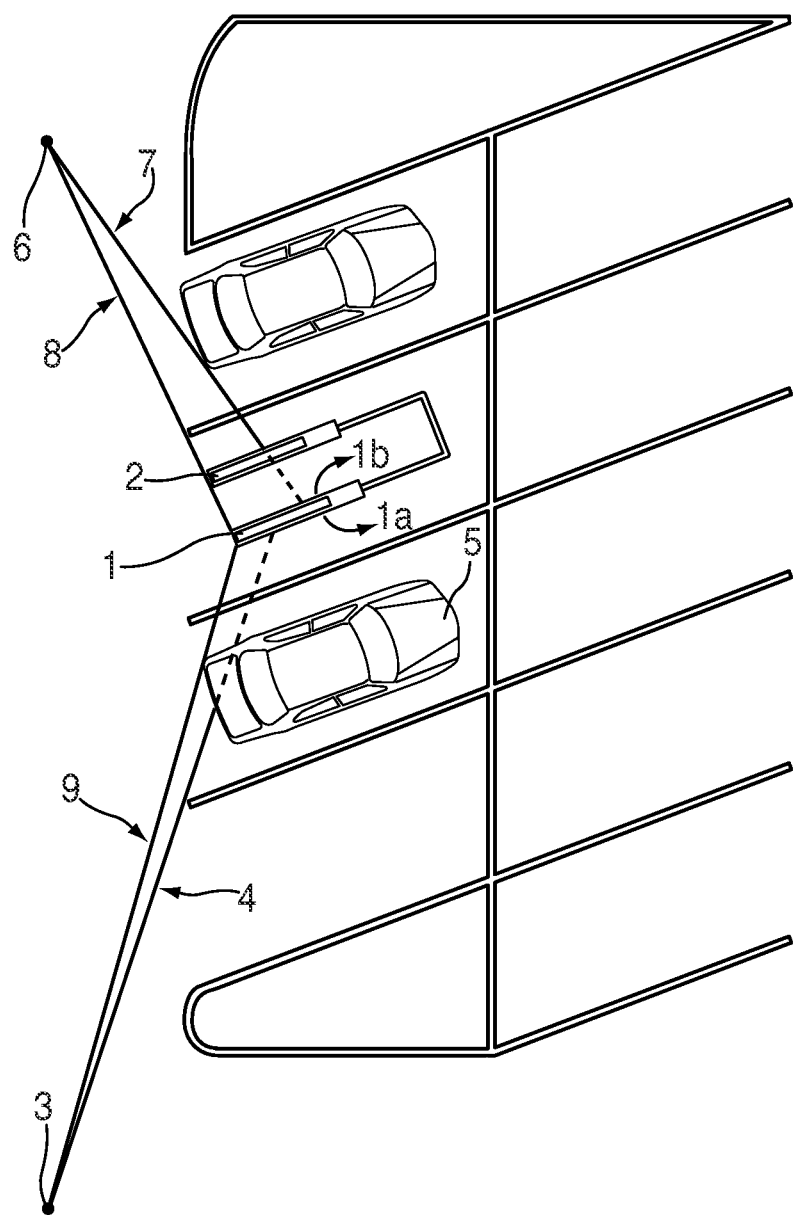
FIG. 3A illustrates an aerial view of a shopping cart corral with two walls of equal length and two advertisement panels in an aligned position.
Figure 3B:
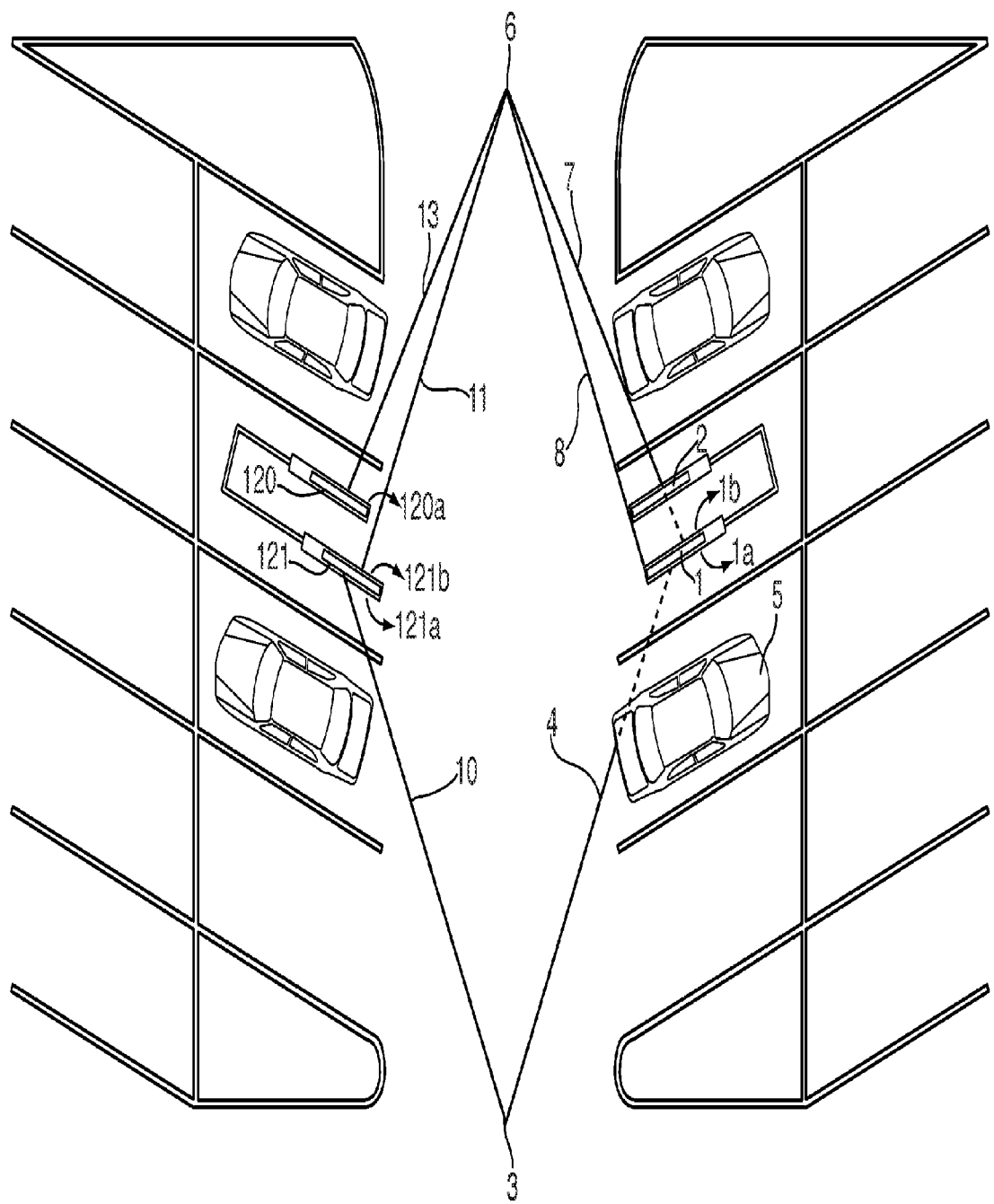
FIG. 3B illustrates an aerial view of the shopping cart corral of FIG. 3A on the right, and a simplified version of the shopping cart corral of FIG. 2 on the left.
Figure 4:
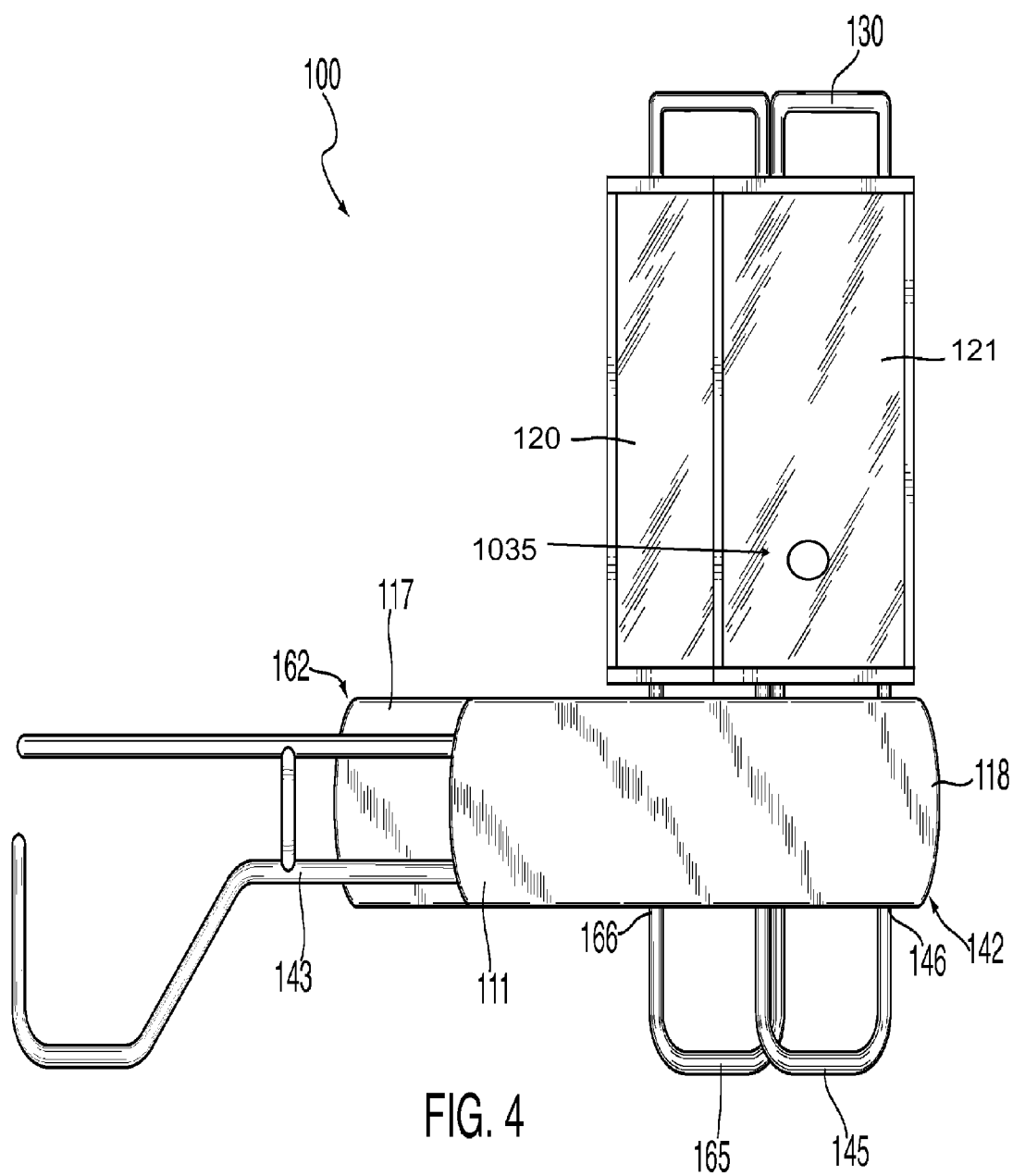
FIG. 4 illustrates a side view of the shopping cart corral of FIG. 2.
Figure 5:
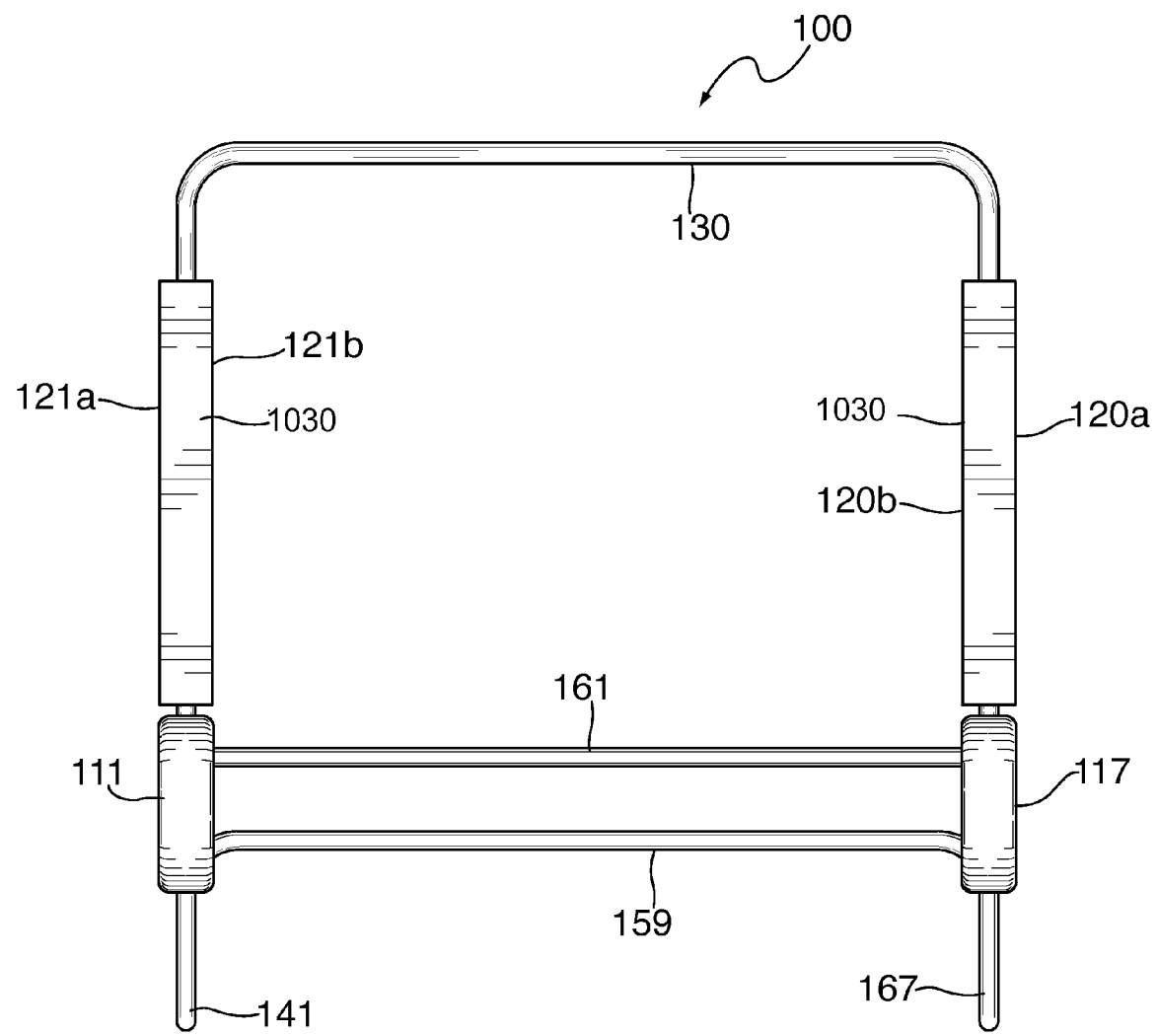
FIG. 5 illustrates a front view of the shopping cart corral of FIG. 2.
Figure 6:
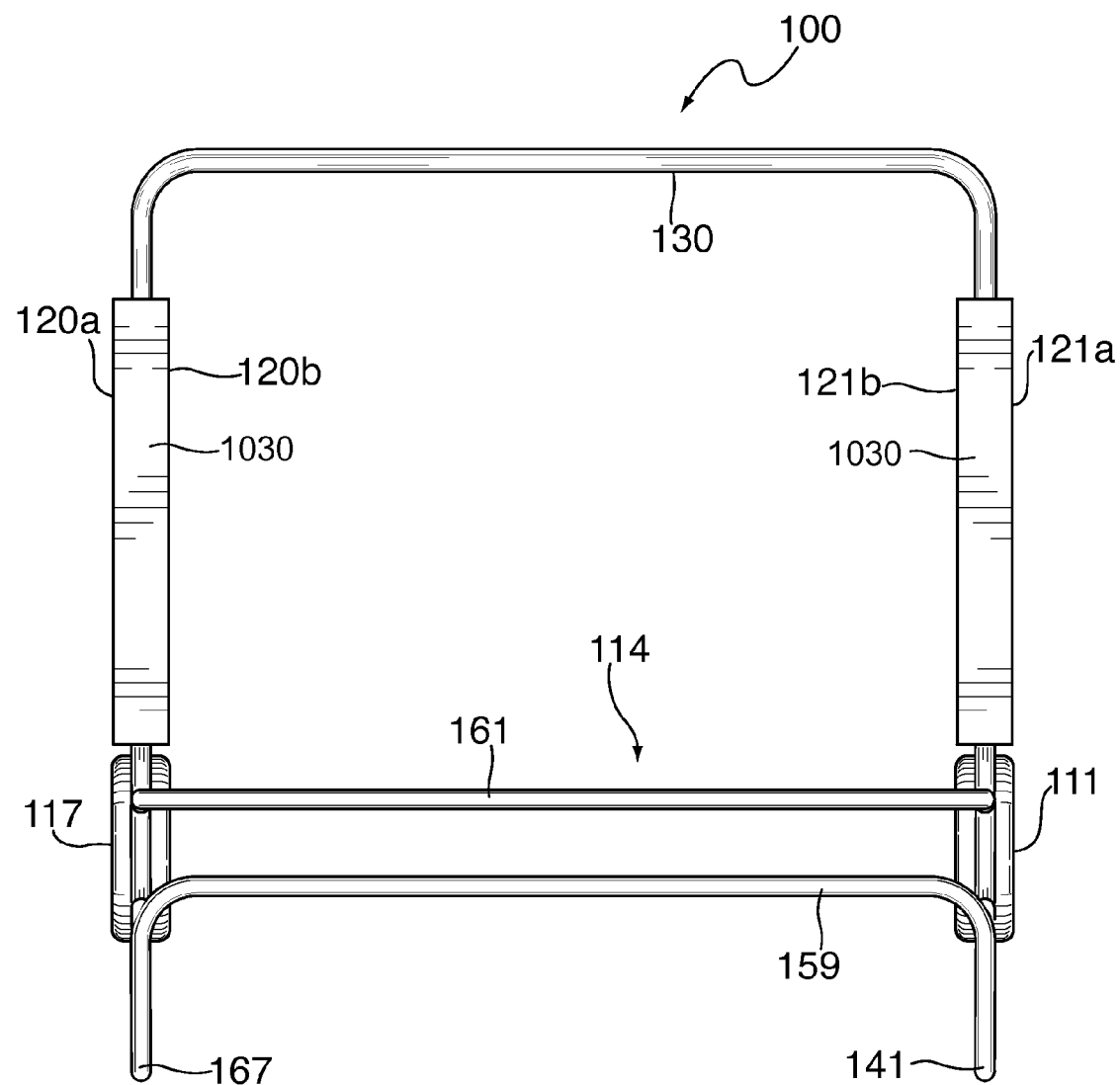
FIG. 6 illustrates a rear view of the shopping cart corral of FIG. 2.
Figure 7:
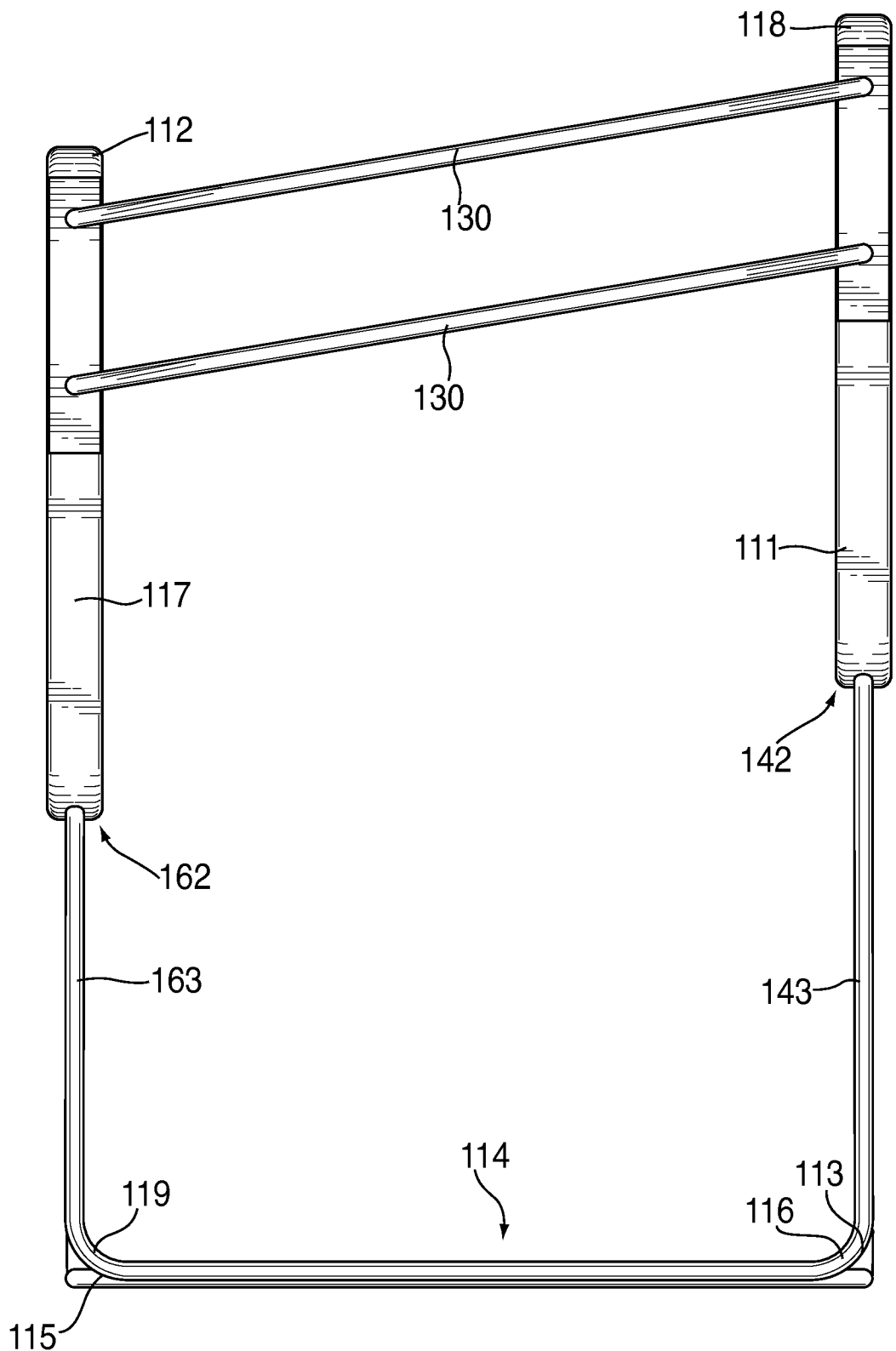
FIG. 7 illustrates an aerial view of the shopping cart corral of FIG. 2.

Turning to the drawings, FIG. 1A illustrates a perspective view of the shopping cart corral that includes two walls of equal length and two advertisement panels situated opposite each other in accordance with certain embodiments of the invention. FIG. 1B illustrates a perspective view of a shopping cart corral that includes two walls of equal length and an upper roof portion in accordance with certain embodiments of the invention. FIG. 2 illustrates a perspective view of a shopping cart corral with two walls that differ in length and which includes two staggered advertisement panels in accordance with certain embodiments of the invention. FIG. 3A illustrates an aerial view of a shopping cart corral with two walls of equal length and two advertisement panels 1 and 2 in an aligned position, such as the corral described in U.S. patent application Ser. No. 12/456,875, filed on Jun. 24, 2009. Advertisement panel 1 has two sides that can display advertisements simultaneously, 1a and 1b. FIG. 3B illustrates an aerial view of the shopping cart corral of FIG. 3A on the right, and a simplified version of the shopping cart corral of FIG. 2 on the left. FIG. 4 illustrates a side view of the shopping cart corral of FIG. 2. FIG. 5 illustrates a front view of the shopping cart corral of FIG. 2. FIG. 6 illustrates a rear view of the shopping cart corral of FIG. 2, and FIG. 7 illustrates an aerial view of the shopping cart corral of FIG. 2.

While the present invention has applicability to all structures or facilities, whether indoors or outdoors, with at least two substantially parallel walls with panels that may display advertisements, such as airport luggage carts, bicycle racks, train or bus stop shelters, and telephone booths, the drawings used to describe the invention depict, by way of example, shopping cart corrals in a parking lot, as discussed below.

FIG. 1A illustrates a NFC-enabled shopping cart corral 20 in accordance with certain embodiments of the present invention. The shopping cart corral 20 includes two substantially parallel walls 22 of equal length. The corral 20 includes a pair of advertisement panels 21, each of which may be capable of displaying one or more advertisements. Advertisements may be displayed on both sides of the advertisement panels 21. Each advertisement panel 21 or advertisement may include one or more NFC components 1035 that are configured to perform a promotional function when a mobile device of a customer or other individual comes in contact with the NFC component 1035 or is placed in close proximity to the NFC component 1035. Shopping cart corral 20 can be placed in the parking lot or at another location in the vicinity of a business. As individuals take or return shopping carts to or from the corral 20, the individuals may interact with the NFC component 1035 to obtain promotional content associated with the business or to facilitate other types of promotional activities as described in further detail below.

FIG. 1B illustrates another NFC-enabled shopping cart corral 25 in accordance with certain embodiments of the present invention. This shopping cart corral 25 also includes two walls 27 of equal length and an upper roof portion 28 that protects shopping carts and individuals from weather conditions and provides stability for the structure. A pair of advertisement panels 26 are provided that can display one or more advertisements. Similar to the shopping cart corral 20 in FIG. 1A, each advertisement panel 26 or advertisement may include one or more NFC components 1035 configured to perform a promotional function when a mobile device of a customer or other individual comes in contact with the NFC component 1035 or is placed in close proximity to the NFC component 1035.

FIG. 3A shows a shopping cart corral that has two substantially parallel walls of equal length and two advertisement panels 1 and 2 affixed on its walls in an aligned, substantially parallel fashion. Advertisements can be displayed on either side of the panels, as shown by the sides 1a and 1b of panel 1. However, the visibility of 1a is reduced, if not completely blocked, when a vehicle is parked at the parking space 5, obstructing the view of the advertisement on 1a from viewpoint 3. For example, a person approaching the parking space from viewpoint 3 would not be able to see side 1a of one panel because the vehicle of space 5 would obstruct the view of the advertisement on side 1a, whether the customer attempts to look through line 4 or line 9 of his/her field of vision. In addition, the view of side 1b is also obstructed, if not completely blocked, by panel 2 when customers approach from viewpoint 6. For example, a person approaching the parking space from viewpoint 6 would not be able to see side 1b of one panel because panel 2 would obstruct the view of the advertisement on side 1b, whether the customer attempts to look through line 7 or line 8 of his/her field of vision.

FIG. 3B shows the shopping cart corral in FIG. 3A on the right and a simplified corresponding illustration of an exemplary shopping cart corral according to certain embodiments of the invention on the left for purposes of comparison. Advertisement panels 120 and 121 are affixed on opposite walls of the shopping cart corral in a staggered fashion, as a result of the difference in lengths between the walls. The staggered arrangement provides a clear, unobstructed view of side 121a of the advertisement panel 121 when customers approach from viewpoint 3 through line 10 in their field of vision, as a result of the longer wall on which panel 121 is affixed. Also because of the staggered arrangement, customers approaching from viewpoint 6 can now see both sides 120a and 121b through lines 13 and 11 respectively, because the obstruction from panel 120 is greatly reduced as compared to that from panel 2 on the right hand side of FIG. 3B. On the right hand side of FIG. 3B, customers can only see panel 2 through line 7 in their field of vision, but not panel 1, as discussed above.

Also because of the longer member on which 121 is affixed, damage to vehicles can be prevented because customers may not always push their shopping carts deep into the enclosure to avoid accidental collision with vehicles. The longer member provides extra protection for the vehicles parked by its side.

FIGS. 2 and 4-7 show the detailed construction of the shopping cart corral 100 with the advertisement panels 120 and 121 affixed on the walls of different lengths. The advertisement panels 120 and 121, or advertisements displayed by the advertisement panels 120 and 121, may include one or more NFC components 1035 for enabling near field communication with a mobile device or other device. The first wall 118 is longer than the second wall 112, resulting in a staggered arrangement of the two walls, and thus, the affixed advertisement panels, that can be used to alleviate the problem shown in FIG. 3A. Shopping cart corral 100 is merely exemplary and is not limited to the embodiment presented herein. Structures or facilities with at least advertisement panels 120 and 121 are part of the invention, which can be employed in many different embodiments or examples not specifically depicted or described herein.

As illustrated in FIGS. 2 and 4-7, shopping cart corral 100 can include: (a) an enclosure 110; and (b) two or more advertisement panels 120 and 121. Shopping cart corral 100 can be placed in the parking lot of a store to hold shopping carts after customers are finished using the shopping carts.

In various embodiments, enclosure 110 can include: (a) a first side or wall 111 with a first end 118 and a second end 113 opposite first end 118; (b) a second side or wall 114 with a first end 116 and a second end 115 opposite first end 116; (c) a third side or wall 117 with a first end 112 and a second end 119 opposite first end 112; and (d) one or more bar(s) 130. In other examples, enclosure 110 does not include one or more of first wall 111, second wall 114, third wall 117, and bar(s) 130.

First wall 111, second wall 114, third wall 117, and bar(s) 130 can define enclosure 110. Enclosure 110 can have an interior space defined by the interior surfaces of first wall 111, second wall 114, third wall 117, and bar(s) 130. An exterior space can be a space located outside of enclosure 110. Furthermore, enclosure 110 can have an opening 127 configured to receive the one or more shopping carts in the interior space. In some examples, opening 127 can be between first end 118 of first wall 111 and first end 112 of third wall 117.

In certain embodiments, first wall 111 can be coupled to second wall 114. For example, second end 113 of first wall 111 can be coupled to first end 116 of second wall 114. Similarly, second wall 114 can be coupled to third wall 117. For example, second end 115 of second wall 114 can be coupled to second end 119 of third wall 117. Additionally, first wall 111 can be spaced apart from third wall 117 such that two or more shopping carts can be placed between first wall 111, second wall 114, and third wall 117. Bar(s) 130 can couple first wall 111 with third wall 117. In some examples, bar(s) 130 can, along with legs 141 and 167 and walls and panels 111, 121, 120 and 117, act as one integral support system for the corral. Because the corral can be used outdoors and is preferably able to withstand weather conditions, including wind, rain and storms as well as address other issues (such as collisions) that may compromise the structure, the multi-part integral support system shown in the figures and described further below helps increase the strength, stability, and rigidity of the corral.

First wall 111 can include: (a) a leg 141 having a top portion 146 and a bottom portion 145; (b) a barricade section 142 coupled to top portion 146 and advertisement panel 121; and (c) a connector section 143 coupled to barricade section 142 and coupled to first end 116 of second wall 114; and (d) bar(s) 130 for coupling panels 120 and 121 together from the top. Bar(s) 130 can be in the form of a single bar, two or more parallel bars, or two or more bars that are crisscrossed between the two members 111 and 117. In some examples, bottom portion 145 can be configured to rest on a surface (such as, for example, the ground, a parking lot surface, etc.) and at least partially support enclosure 110. In other examples, first wall 111 can have other designs or configurations.

Second wall 114 can include connector sections 159 and 161 with one or more bottom portions 160. In some examples, bottom portions 160 can be part of connector section 159 and configured to rest on a surface and at least partially support enclosure 110. In the example illustrated in FIGS. 2 and 4-7, each of connector sections 159 and 161 can include a metal or plastic rod coupled to second end 113 of first wall 111 and second end 119 of third wall 117. In other examples, connector section 161 can have other designs or configurations. For example, connector section 161 could include a barricade section similar to barricade section 142.

Third wall 117 can be identical or substantially similar to first wall 111. For example, third wall 117 can include: (a) a leg 167 having a top portion 166 and a bottom portion 165; (b) a barricade section 162 coupled to top portion 166 and advertisement panel 120; (c) a connector section 163 coupled to barricade section 162 and coupled to second end 115 of second wall 114; and (d) bar(s) 130 for coupling panels 120 and 121 together from the top. In some examples, bottom portion 165 can be configured to rest on a surface and at least partially support enclosure 110. In other examples, third wall 117 can have other designs or configurations.

In certain embodiments, bar(s) 130, along with legs 141 and 167 and walls and panels 111, 121, 120 and 117, can act as one integral support system for the corral. The integral support structure, which can be in the form of a railing, is formed wherein the bar(s) 130 is/are coupled to the legs 141 and 167 of the first wall 111 and third wall 117 respectively, and the resulting coupled structure goes through the panels 121 and 120, so as to affix the panels on the first and third walls 111 and 117. The multi-part integral support system provides additional strength, stability and rigidity for the corral.

In certain embodiments, legs 141 and 167, connector sections 143 and 163, and/or bar(s) 130 can be at least partially formed using one or more metals, plastics or a combination of metals and plastics. For example, legs 141 and 167, connector sections 143 and 163, and/or bar(s) 130 can be formed from steel or aluminum. In the same example, connector sections 143 and 163 can be formed using one or more plastics, metals, or a combination of plastics and metal.

Advertisement panels 120 and 121 can be considered part of the enclosure 110, and the panels are separable but coupleable to enclosure 110.

Each of advertisement panels 120 and 121 can be configured to display one or more advertisements, including print advertisements. For example, advertisement panels 120 and 121 could display one or more 3 foot by 4 foot poster(s) or one or more 4 foot by 6 foot poster(s).

The owner of the store, parking lot and/or shopping corral can use shopping cart corral 100 as a revenue stream. For example, one or more advertisement panel(s) 120 and 121 can be leased to an advertiser. By leasing one or more advertisement panel(s) 120 and 121 for displaying advertisements, an advertiser can make a commercial impression on a wide variety of pedestrian and vehicular traffic through the parking lot.

The advertisements displayed in panels 120 and 121 can be aesthetically pleasing (i.e., colorful, eye-catching, artistic, etc.) and can improve the overall appearance of the parking lot. As a result, advertisement panels 120 and 121 can facilitate attracting additional customers and traffic to the parking lot and/or store.

Advertisement panels 120 and 121 can be configured in any shape and/or size. For example, in one embodiment not shown, advertisement panels 120 and 121 are configured to have a width approximately equal to the lengths of barricade sections 142 and 162. The advertisement panels 120 and 121 can also be configured to be circular, oval-shaped, triangular, as a substantially parallelogram, and/or in any other shapes or sizes.

In certain embodiments, one or more advertisement panel(s) 121 and 120 can be coupled adjacent to first end 118 of first wall 111 and first end 112 of third wall 117 respectively, such that when a vehicle is parked next to corral 100, the vehicle does not block and/or only partially blocks advertisement panels 120 and 121. The coupling of one or more advertisement panels 120 and 121 near opening 127 can facilitate better viewing of advertisement panels 120 and 121. Such better viewing of advertisement panels 120 and 121 can improve the aesthetics of a parking lot. While coupling advertisement panels 120 and 121 near opening 127 is described in detail for exemplary corral 100, advertisement panels can be similarly coupled near the opening of other types and configurations of corrals.

The first wall 111 is longer than the third wall 117 by the distance as shown in 120d, which can vary from a few inches to a few feet. The extra length that the first wall 111 has further enhances visibility of either side of panel 121, as illustrated in FIG. 3B. In addition, the longer first wall 111 prevents damage to vehicles because customers may not always push their shopping carts deep into the enclosure 110. The vehicles outside the enclosure on the side of first wall 111 have additional protection because of the extra length of first wall 111.

Moreover, one or more advertisement panels 120 and 121 can be coupled to any other portions of a corral as well. For example, in another embodiment, not shown, one or more advertisement panels 120 and 121 can be coupled adjacent to first end 116 of second wall 114 and/or second end 115 of second wall 114. For example, advertisement panel 120 can be coupled adjacent to second end 115 of second wall 114 and advertisement panel 121 can be coupled adjacent to first end 116 of second wall 114.

The owner of shopping cart corral 100 can sell the right to place advertisement in advertisement panels 120 and 121. Thus, shopping cart corral 100 can produce revenues for the store and/or owner of the corral or advertising space. Furthermore, the addition of advertisement panels 120 and 121 provide an unexpected benefit over existing shopping cart corrals. In some examples, the advertisements in advertisement panels 120 and 121 will be routinely updated or changed. Accordingly, shopping cart corral 100 will not be an eyesore or a blemish in the parking lot of the store. The changing advertisement will give shopping cart corral 100 a vibrant, updated, fresh look, not found in existing shopping cart corrals.

In certain embodiments, advertisement panels 120 and 121 can each display two or more advertisements. For example, the at least one advertisement panels 120 and 121 can be configured to hold an advertisement such that the advertisement is visible from a space exterior to the receptacle. That is, for example, advertisement panel 121 can include at least one display 121a located at the exterior surface of first wall 111 and at least one other display 121b located at the interior surface of first wall 111. In some embodiments, displays 121a and 121b can include a backing board (e.g., corkboard) surrounded by a metal or plastic frame with a clear plastic or glass cover. The advertisement(s) in displays 121a and/or 121b can be viewed through the clear plastic or glass cover. In other embodiments, advertisement panel 121 can include a frame with a clear cover on both the interior and exterior surface. In yet another embodiment, a two-sided advertisement can be placed in advertisement panel 121 and viewed from both the interior and exterior of enclosure 110.

In other examples, advertisement panels 120 and 121 can display electronic and/or multimedia advertisements. In certain embodiments, the advertisement panels 120 and 121 may include a touch screen interface that is capable of receiving input (e.g., possibly via gestures) from individuals. For example, one or more of advertisement panels 120 and 121 can include an electronic display configured to display video, electronic images, and/or audio-video advertisements. In yet other examples, one or more of advertisement panels 120 and 121 can include interactive or dynamic advertisements that allow potential customers to interact with the advertisement. For example, advertisement panels 121 could include an electronic advertisement on a screen asking the potential customer to touch a button or the screen to receive a discount on a product (e.g., a coupon). When the user touches the button or the screen, a printer attached to the screen could print the user a coupon or direct the user to go to a location in the adjacent store to receive the product discount. As explained in further detail below, the advertisement panels 120 and 121 and/or advertisements may include a NFC component 1035 that permits a communication connection to be established with a mobile device of a potential customer or other individual. The connection may be utilized, inter alia, to transfer content (e.g., coupons or multimedia advertisements) to the mobile device and/or may cause the mobile device to execute certain functions (e.g., display a website, download an application, enroll in a marketing campaign, or establish a connection with a Bluetooth™ or Wi-Fi network).

Figure 8:
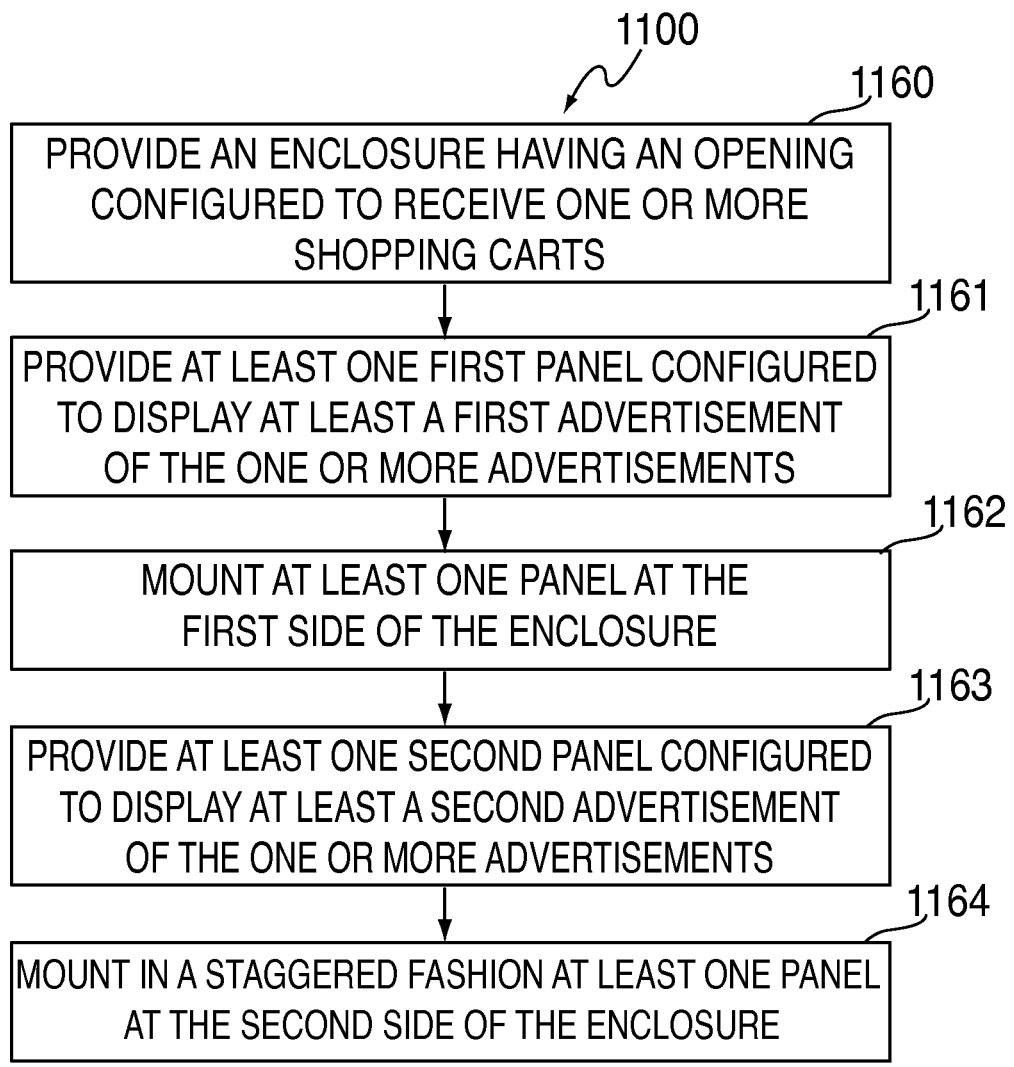
FIG. 8 illustrates a flow chart of a method for providing a shopping cart corral with at least two substantially parallel advertisement panels arranged in a staggered fashion.

FIG. 8 illustrates a flow chart of a method 1100 of providing a corral with at least two substantially parallel walls of different lengths configured to hold one or more shopping cart and display one or more advertisements with at least two staggered advertisement panels, according to certain embodiments.

Method 1100 in FIG. 8 includes an activity 1160 of providing an enclosure having an opening configured to receive the one or more shopping carts. As an example, the enclosure can be identical or similar to enclosure 110 of FIG. 2. The opening in the enclosure can be similar or identical to opening 127 of FIG. 2.

Method 1100 in FIG. 8 continues with an activity 1161 of providing at least one first panel configured to display at least a first advertisement of the one or more advertisements. As an example, the at least one first panel can be similar or identical to advertisement panel 120 and 121 of FIG. 2. The first panel may include one or more configurable NFC components.

Subsequently, method 1100 includes an activity 1162 of mounting the at least one first panel at a first side of the enclosure. As an example, the at least one first panel can be mounted at a first side of the enclosure similar or identical to the mounting of advertisement panel 121 at first wall 111 of enclosure 110 as illustrated in FIG. 2.

Next, method 1100 includes an activity 1163 of providing at least one second panel configured to display at least a second advertisement of the one or more advertisements. As an example, the at least one first panel can be similar or identical to advertisement panel 120 and 121 of FIG. 2. The second panel may include one or more configurable NFC components.

Method 1100 in FIG. 8 continues with an activity 1164 of mounting, in a staggered fashion, at least one second panel at the second side of the enclosure. As an example, the at least one second panel can be mounted at the second side of the enclosure similar or identical to the mounting of advertisement panel 120 at third wall 117 of enclosure 110 as illustrated in FIG. 2.

Figure 9:
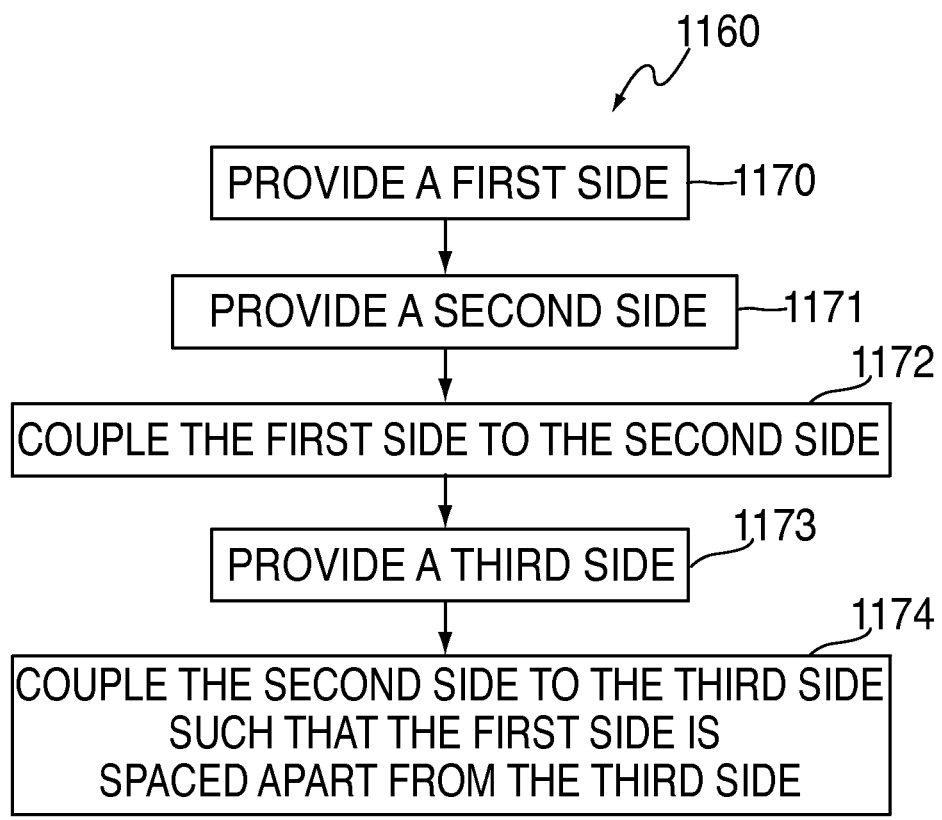
FIG. 9 illustrates a flow chart of an activity of providing an enclosure.

FIG. 9 illustrates a flow chart of activity 1160 of providing the enclosure, according to certain embodiments. Activity 1160 in FIG. 9 includes a procedure 1170 of providing a first side. As an example, the first side can be similar or identical to first wall 111 of FIG. 2.

Subsequently, activity 1160 in FIG. 9 can include a procedure 1171 of providing a second side. As an example, the second side can be similar or identical to second wall 114 of FIG. 2.

Activity 1160 in FIG. 9 can continue with a procedure 1172 of coupling the first side to the second side. As an example, the first side can be coupled to the second side similar or identical to the coupling of first wall 111 to second wall 114, as illustrated in FIG. 2.

Next, activity 1160 in FIG. 9 can include a procedure 1173 of providing a third side. As an example, the third side can be similar or identical to third wall 117 of FIG. 2.

Activity 1160 in FIG. 9 can continue with a procedure 1174 of coupling the second side to the third side such that the first side is spaced apart from the third side. As an example, the second side can be coupled to the third side similar or identical to the coupling of second wall 114 to third wall 117, as illustrated in FIG. 2. After procedure 1174, activity 1160 is complete.

Figure 10:
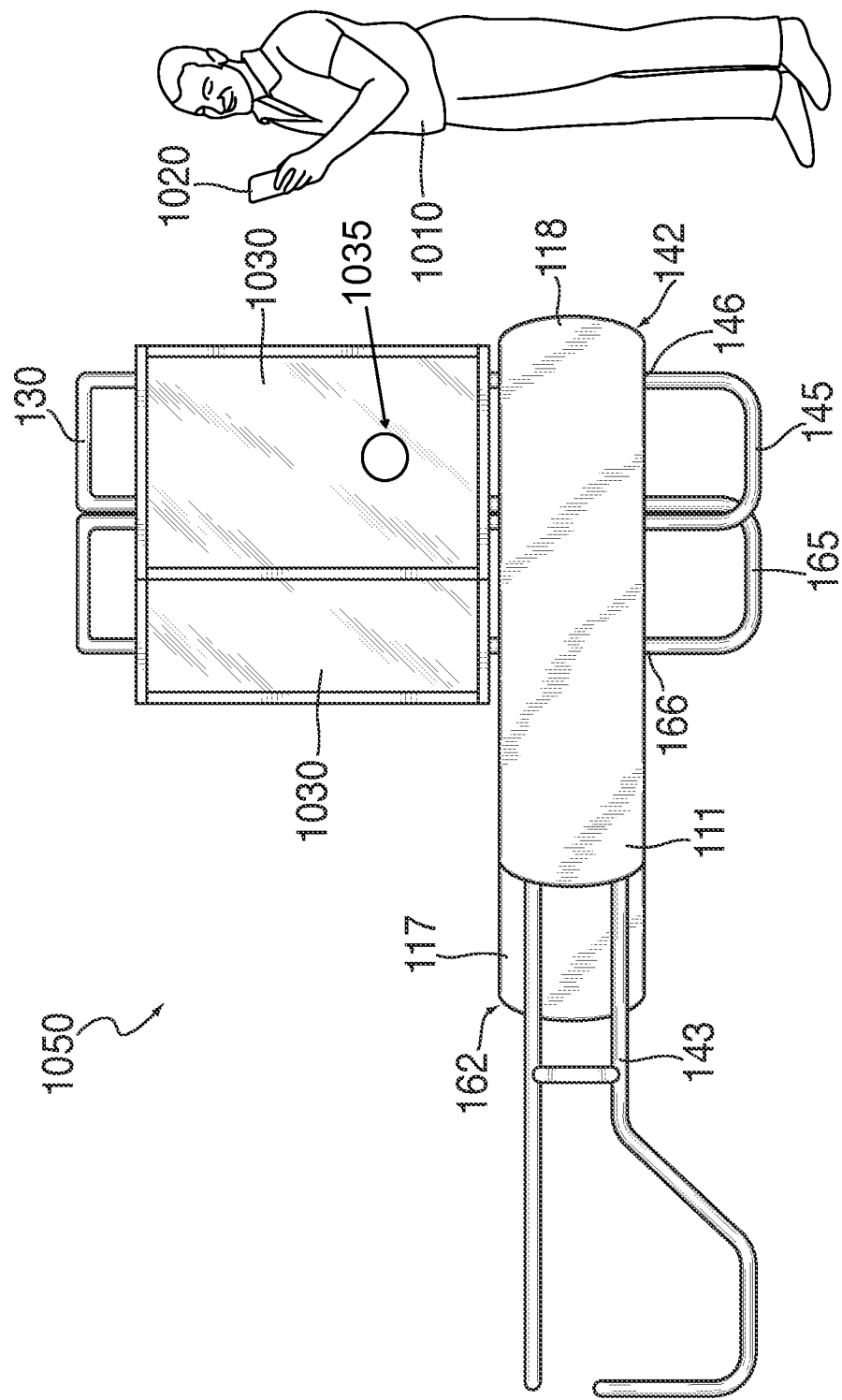
FIG. 10 illustrates a side view of a NFC-enabled corral in use in accordance with certain embodiments of the present invention.

FIG. 10 illustrates a corral 1050 that is enabled to communicate via near field communication with a mobile device 1020 of a potential customer or other individual in accordance with certain embodiments of the present invention. As explained in further detail below, the connection between the mobile device 1020 and the NFC-enabled corral 1050 may provide a number of advantages for both an advertiser and an individual 1010 such as a potential customer.

In certain embodiments, the mobile device 1020 may represent a cell phone, smart phone, personal digital assistant (PDA), tablet, pager or other personal electronic device. In order to facilitate communication, both the mobile device 1020 and the corral 1050 may include a NFC component that enables a connection to be established between the mobile device 1020 and the corral 1050 when the mobile device 1020 comes into contact with or is placed in close proximity to (e.g., within a few inches) the NFC component 1035 of the corral 1050. In certain embodiments, a NFC component 1035 of the corral is integrated into one or more advertisement panels 1030 of the corral 1050 (e.g., integrated into the actual panels themselves or integrated into displays included on the panels). In certain embodiments, the NFC component 1035 may be integrated into one or more advertisements located in the advertisement panels 1030 of the corral 1050.

The NFC component associated with either the corral 1050 or mobile device 1020 may represent any type of device that is able to establish a communication connection in accordance with the NFC standards, protocols or specifications. In certain embodiments, the NFC component may represent a passive, unpowered device or chip (also referred to as a "NFC tag") that can be activated or powered by an electromagnetic field. In certain embodiments, the NFC component may represent a device that includes a power supply and which actively generates an electromagnetic field in compliance with the NFC protocols. The connection between the mobile device 1020 and the corral 1050 may enable one-way or two-way communication between the mobile device 1020 and the corral 1050.

In certain embodiments, the mobile device 1020 and the NFC-enabled corral 1050 may communicate using a passive communication mode or an active communication mode. In passive communication mode, either the corral 1050 or the mobile device 1020 includes an unpowered chip that lacks a power source. In order to facilitate communication in this mode, the NFC component 1035 associated with the other device may generate an electromagnetic carrier field that can be utilized to power the chip when the individual 1010 taps the mobile device 1020 against the corral or brings the mobile device 1020 into close proximity with the corral. On the other hand, in active communication mode, both the corral 1050 and the mobile device 1020 include power supplies and generate their own respective electromagnetic field. The mobile device 1020 and corral 1050 may communicate by alternately generating their own electromagnetic fields and deactivating their fields while awaiting data.

As mentioned briefly above, the connection provided between the mobile device 1020 and the NFC-enabled corral 1050 can be utilized for numerous purposes related to advertising a product or service, or enhancing the experience of a potential customer or other individual 1010. In certain embodiments, the establishment of a connection between the mobile device 1020 and the NFC-enabled corral 1050 can trigger certain promotional functions to be performed. For example, this may cause promotional content to be transferred to the mobile device 1020. The type of content that is transferred to the mobile device 1020 in response to establishing a connection with the NFC component 1035 of the corral 1050 may vary. In certain embodiments, the promotional content may include a coupon, advertisement, promotion, multimedia file (e.g., image, video, song, e-book or audio file) or other digital content. The promotional content may also include an application (e.g., a mobile application or web-based application). As explained in further detail below, the content transferred to the mobile device 1020 may include content that is relevant to one or more businesses located in the vicinity of the corral 1050 (e.g., located in the same shopping center as the businesses). For example, the promotional content may include a map of a shopping center or may include a coupon or offer that can be redeemed at one of the businesses.

The manner in which the content is transferred to the mobile device 1020 may vary. In certain embodiments, the content may be provided to the mobile device 1020 directly via the NFC link that is established between the mobile device 1020 and the corral 1050. In some cases, establishing a link between the mobile device 1020 and the corral 1050 can cause the mobile device 1020 to retrieve the content. To accomplish this, the NFC component 1035 associated with the corral 1050 may transmit data to the mobile device 1020 which identifies the location of the content and/or the type of function to be performed by the mobile device 1020 in order to retrieve the content. For example, the NFC-enabled corral 1050 may transmit data which identifies a URL or network address that indicates the location of the content and the mobile device may utilize the URL or network address to retrieve the data over a network (e.g., such a network that includes the Internet, a cellular network or a local area network).

In response to establishing a connection between the NFC-enabled corral 1050 and the mobile device, the NFC component 1035 integrated into the corral 1050 may transmit data or commands to the mobile device 1020 which cause the mobile device 1020 to execute certain functions or applications. For example, the NFC-enabled corral 1050 may transmit commands to the mobile device 1020 which cause the mobile device 1020 to launch a web browser application on the mobile device 1020 and to display and/or download content associated with a particular URL. As another example, NFC-enabled corral 1050 may transmit commands to the mobile device 1020 which cause the mobile device 1020 to launch an application store (e.g., AppStore™ or Android Market™) and to display an interface that permits an application (e.g., a mobile app) to be downloaded to the mobile device 1020. The application may be downloaded to the mobile device 1020 automatically or may downloaded in response to an input from the individual 1010. As an another example, NFC-enabled corral 1050 may transmit commands to the mobile device 1020 which cause the mobile device 1020 to launch a web browser or application associated with a media store (e.g., Google Play™ or iTunes™) and to display an interface that permits media (e.g., videos, games, images, songs, etc.) to be downloaded to the mobile device 1020. Similarly, the media may be downloaded to the mobile device 1020 automatically or may downloaded in response to an input from the individual 1010. As an even further example, the NFC-enabled corral 1050 may transmit commands to the mobile device 1020 which cause the mobile device 1020 to sign up for a mailing list, sweepstakes or raffle.

The connection between the corral 1050 and the mobile device 1020 may also cause the mobile device 1020 to perform other types of promotional functions including, but not limited to, updating loyalty card information associated with an individual 1010, establishing a connection with an available network (e.g., connect to a Bluetooth™ or Wi-Fi network in the vicinity of the corral), subscribing to a mailing list, updating settings on the mobile device 1020, sending a text message or e-mail, downloading or launching an application, submitting a payment, or interacting with a social media application or website (e.g., by "liking" a business on Facebook™, following a business on Twitter™ or accessing information associated with an individual's 1010 connections).

In certain embodiments, the promotional function facilitated by the NFC component 1035 of the corral 1050 is directly linked to the advertisement that is displayed in the advertisement panel 1030 of the corral. For example, when a mobile device 1030 is placed in close proximity to the NFC component 1035, the product or service which is the subject of the advertisement being displayed may be added to a shopping cart (e.g., a shopping cart that is provided via a website or application that is displayed on the mobile device 1020). Similarly, an individual 1010 may also purchase a product or service which is the subject of the advertisement by placing the mobile device 1020 in close proximity to the NFC component 1035, possibly in a manner which is the similar to using Google Wallet™ or ISIS Mobile Wallet™.

Other types of promotional functions may also be directly linked to the advertisement that is displayed in the advertisement panel 1030 of the corral 1050. For example, a coupon or discount for the product or service that is the subject of the advertisement may be transferred to the mobile device 1020. Likewise, the mobile device 1020 may open a web browser and display a web page that provides detailed information about the product or service that is the subject of the advertisement, or which permits the individual 1010 to purchase the product or service that is the subject of the advertisement. Alternatively, the mobile device 1020 may interact with a social networking application or social networking website associated with the product or service (e.g., by accessing a page relevant to the product or service or by "liking" or "following" the product or service or business that provides the product or service). Other types of promotional functions may also be performed that are directly tied to, or associated with, the product or service that is displayed as an advertisement by the corral 1050.

It should be recognized that FIG. 10 demonstrates an exemplary embodiment of a NFC-enabled corral 1050 and is not intended to be limiting. Various modifications can be made without departing from the scope of the present invention. For example, while FIG. 10 discloses an embodiment in which a NFC component 1035 is included in the advertisement panels 1030 (e.g., integrated into the panels or a display on the panels) or advertisements displayed by the corral 1050, the NFC component 1035 can be incorporated into the corral 1050 in other ways as well. In certain embodiments, the NFC component may be incorporated into one or more walls (e.g., walls 112, 118) of a corral or be included as an attachment which is affixed to the corral 1050 in some manner. Likewise, while FIG. 10 depicts a corral 1050 that has the same structure as the corral shown in FIG. 2, it should be apparent that the NFC component and associated functionality can be incorporated into any corral including, but not limited to, corrals having a structure that is similar to the corrals illustrated in FIGS. 1A and 1B.

In certain embodiments, an individual 1010 may interact with a quick response (QR) code rather than interacting with a NFC component. Thus, it should be recognized that any functionality discussed herein that is performed by a mobile device 1020 in response to interacting with a NFC component can alternatively be performed by a mobile device in response to scanning or reading a QR code that is displayed on an advertisement panel or other portion of a corral. For example, an individual 1010 may utilize an application on a mobile device 1020 to read a QR code that is displayed on the corral in order to retrieve content (e.g., coupons, promotions or other content), download applications, interact with social media web pages or application, or to perform other types of promotional functions.

Figure 11:
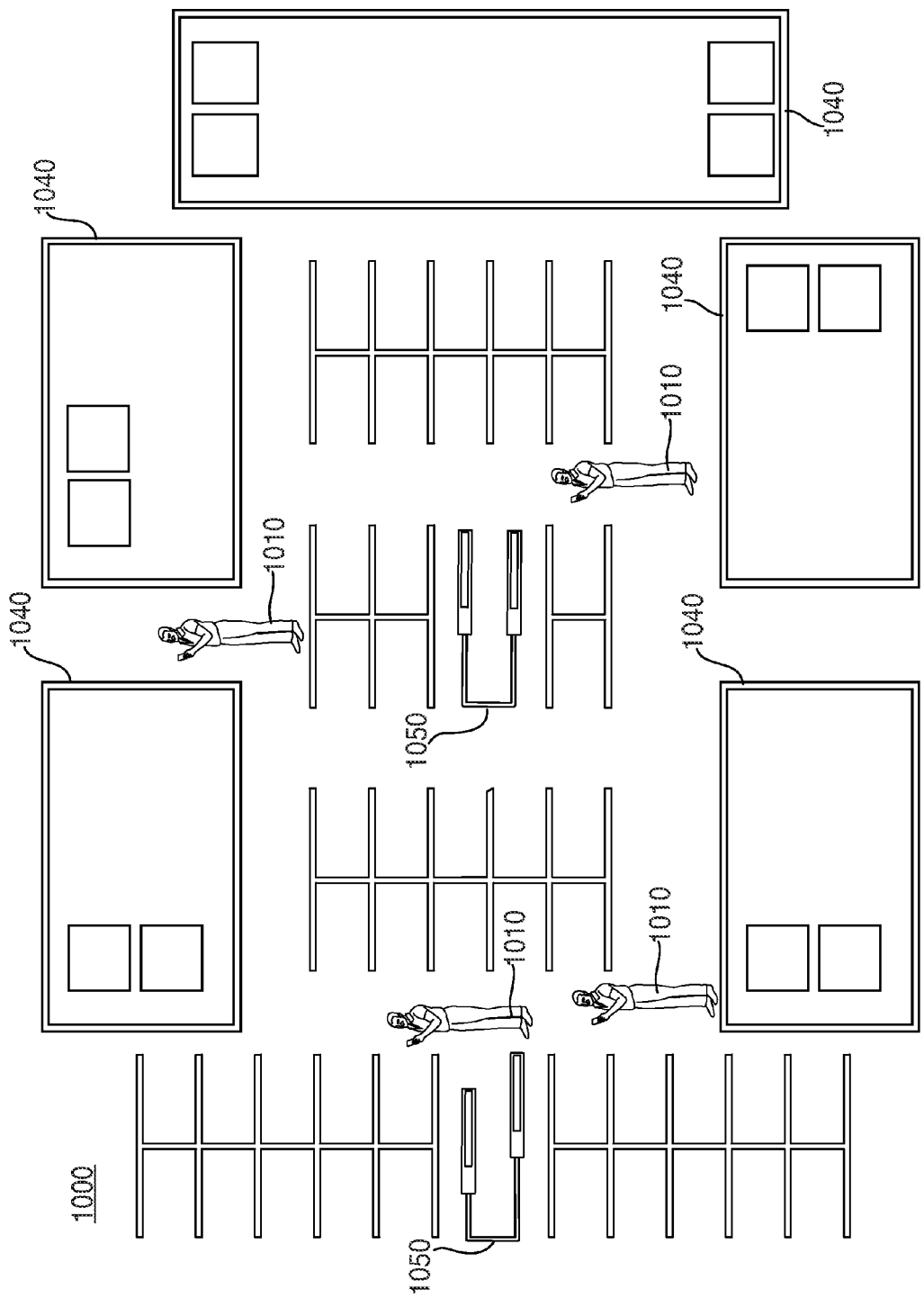
FIG. 11 illustrates an aerial view of a shopping center that includes NFC-enabled corrals in accordance with certain embodiments of the present invention.

Moving on, FIG. 11 illustrates an aerial view of a shopping center 1000 that includes NFC-enabled corrals 1050 in accordance with certain embodiments of the present invention. As shown therein, the shopping center 1000 includes a plurality of businesses 1040 or storefronts, as well as a parking lot that includes two NFC-enabled shopping cart corrals 1050. In certain embodiments, the advertisements displayed by the corrals 1050 and/or the promotional functions enabled by the NFC component 1035 of the corrals 1050 may be associated with one or more of the businesses 1040 located in the shopping center 1000. Individuals may utilize a mobile device 1020 to interact with the NFC component 1035 of the corrals 1050 in order to take advantage of various promotions, coupons or sales that are being provided by the businesses 1040 or to take advantage of other types of promotional functions related to the businesses 1040.

For example, the advertisement panel 1030 of a corral 1050 may display an item offered for sale by one or more of the businesses 1040 located in shopping center 1000 and the NFC component 1035 associated with the corral 1050 may be configured to provide a potential customer or other individual 1010 with a coupon for the item that is displayed in the advertisement by tapping the NFC component 1035 with the mobile device 1020 or by placing the mobile device 1020 in close proximity to the NFC component 1035. In a similar manner, the NFC component 1035 of the corral may be configured to provide a potential customer 1010 with an entire book of coupons that includes coupons for one or more of the businesses 1040 located in the shopping center 1000.

Establishing a connection between an individual's 1010 mobile device 1020 and a NFC-enabled corral 1050 may allow the individual 1010 to take advantage of other types of promotional activities that are directly tied to the businesses 1040 located in the vicinity of the corral 1050. For example, the NFC component of the corral 1050 may be configured to update points for a loyalty program provided by one or more of the businesses 1040, provide a user with a map of the shopping center 1000 (e.g., a map which shows store locations), display the website of a business 1040, add items to a digital shopping list, display a list of products or services that are on sale for a particular day or time period, or provide other related functions.

In certain embodiments, the advertisement panels of the NFC-enabled corral 1050 may display advertisements or other information on an electronic display (e.g., on a liquid-crystal display, plasma display or other type of electronic display). Upon establishing a connection with a mobile device 1020, the advertisement panel may display profile information for individual 1010 associated with a membership or account provided by a business 1040 or the shopping center 1000. For example, the mobile device 1020 may display the name and picture of the individual, as well as information associated with previous purchases made by the individual 1010 at the business 1040 or shopping center 1000 (e.g., items purchased, loyalty points earned, coupons redeemed, receipts or dates of prior visits). The profile information may be provided by the individual's mobile device 1020 or may be retrieved by the corral 1050 via a network connection (e.g., which connects to the Internet, a local area network or other network).

In certain embodiments, establishing a connection between the corral 1050 and the mobile device 1020 may automatically couple the mobile device to a local area network (e.g., a Wi-Fi or Bluetooth™ network) that is provided by one of the businesses 1040 or which is provided in the vicinity of the shopping center 1000. Coupling the mobile device 1020 to the local area network may permit the individual 1010 to access the Internet and may permit the businesses 1040 in the shopping center 1000 to communicate with the mobile device 1020 and display information on the mobile device 1020.

Figure 12:
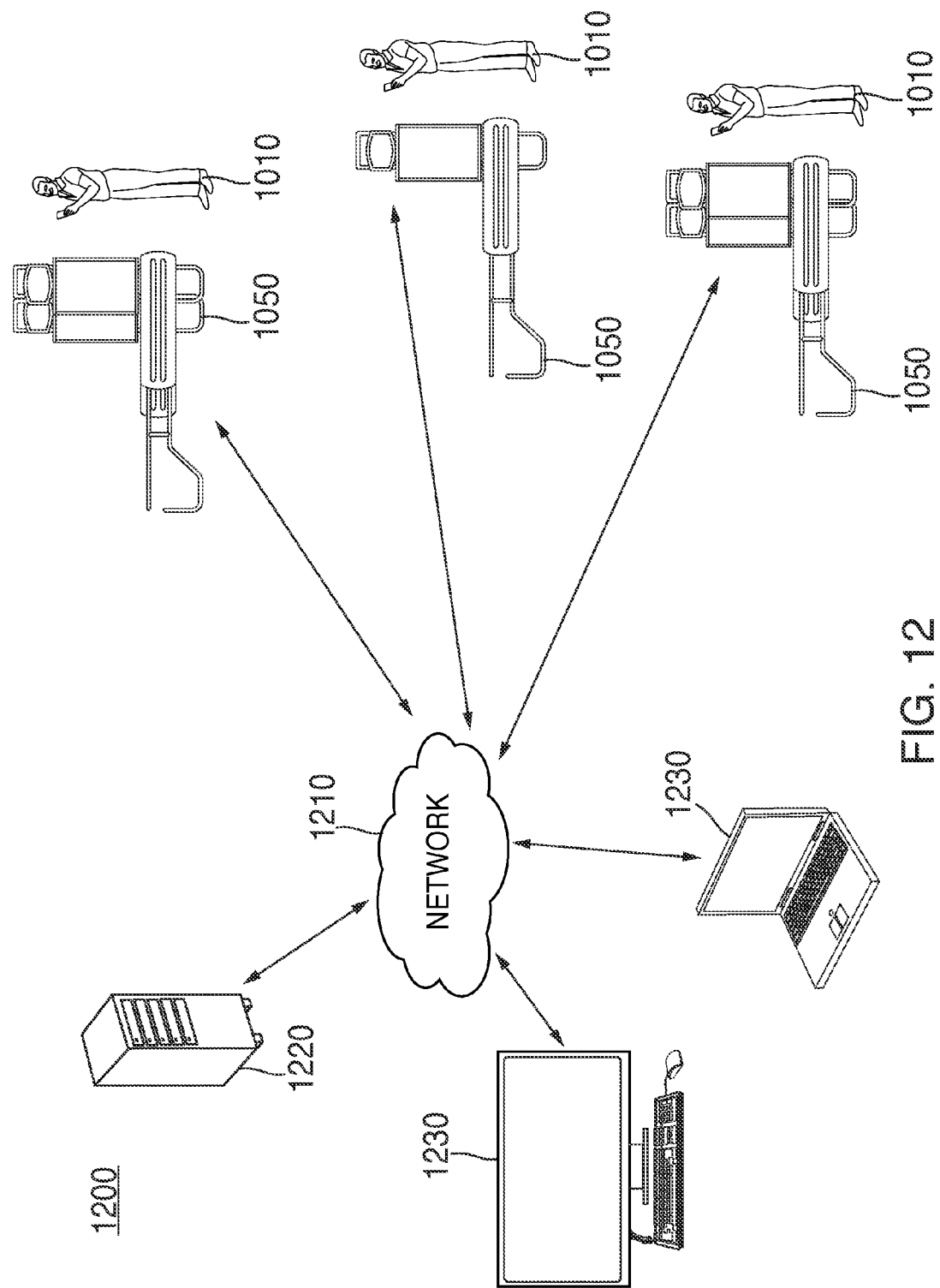
FIG. 12 illustrates a system for providing and managing interactive corrals in accordance with certain embodiments of the present invention.

FIG. 12 illustrates a system 1200 for providing an interactive corral 1050 in accordance with certain embodiments of the present invention. As shown therein, a plurality of corrals 1050 are in communication with a server 1220 and/or advertiser devices 1230 over a network 1210. The network 1210 may be any type of network such as one that includes the Internet, a local area network, a wide area network, an intranet, etc. In certain embodiments, the network 1210 represents the Internet and the corrals are coupled to the network 1210 via a Wi-Fi connection to a local area network.

Any of the components (e.g., the corrals 1050, server 1220 or advertiser devices 1230) shown in the system 1200 may be configured to communicate via wired or wireless links, or a combination of the two. In certain embodiments, the corrals 1050 may include antennas and other circuitry that permit the corrals 1050 to transmit and receive data over a network connection. Each of the components of the system 1200 may also be equipped with one or more computer storage devices (e.g., RAM, ROM, PROM, SRAM, etc.) and one or more processing devices (e.g., a central processing unit) that are capable of executing computer program instructions. Computer storage devices are preferably a physical, non-transitory medium. In certain embodiments, the corrals 1050 may include circuitry for storing the data retrieved over the network connection in a computer storage device, controlling an electronic display of the corral (e.g., changing advertisements that are displayed) and configuring the functionality of the NFC component.

As will be apparent from the discussion that follows, the connection between the corrals 1050 and the network 1210 provides a variety of different advantages. Amongst other things, the connection permits users (e.g., advertisers, individuals who provide advertising services, corral owners or other users) to dynamically update the advertisements displayed on electronic advertisement panels of the corrals and to dynamically reconfigure the functionality which is provided by the NFC components of the corrals 1050. In certain embodiments, the connection with the network 1210 may also facilitate the tracking of customer interactions with the corral 1050 and the generation of campaign monitoring information that is useful for analyzing the success of an advertising campaign. Even further, connecting the corrals 1050 to the network 1210 may also permit individuals 1010 to directly purchase products or services that are advertised on the advertisement panels 1030 and to retrieve various types of information over the network (e.g., loyalty card information, detailed descriptions of products or services that are advertised on the advertisement panels 1030 or profile information associated with an individual 1010).

As mentioned briefly above, users may be permitted to dynamically configure the advertisement panels 1030 of one or more corrals 1050 using an advertiser device 1230 (e.g., which may represent a desktop computer, laptop computer, cell phone, tablet device, personal digital assistant or other type of computing device that is capable of connecting to the network 1210). In certain embodiments, an owner of the corrals 1050 or advertising service provider may rent or lease advertising space on the advertisement panels 1030 of the corrals to different businesses. In some cases, the businesses may be located in the same shopping center 1000 or vicinity as the corral 1050.

An account can be established for each user and the account information may be stored on a server 1220 that is accessible over the network 1210. In certain embodiments, the user may access an account using an advertiser device 1230 by accessing a website (e.g., which may be provided by the owner of the corrals 1050 or an advertising service provider) and submitting login credentials (e.g., username and password). Upon accessing the account, the user can view campaign monitoring information that relates to an advertising campaign associated with the leasing or renting of advertising space on one or more of the corrals. The campaign monitoring information may be stored on a server 1220 and associated with a user's account. Exemplary campaign monitoring information may include information that indicates the advertisements that are being displayed, the number of individuals 1010 who interacted with the advertisements, the locations of the displayed advertisements, and other information that is related the advertising campaign (e.g., the number of purchases or revenue generated by stores located in the vicinity of the corral).

A major advantage of incorporating the NFC component 1035 into a corral is that the interactions with individuals 1010 can be directly tracked and utilized to determine the success of an advertising campaign. Thus, the campaign monitoring information that is accessible to users may also include information related to the use of the NFC component 1035 on the corrals 1050. For example, depending upon the manner in which the NFC component 1035 is configured, the campaign monitoring information may indicate the number of coupons distributed by the corral 1050 (and/or the number of coupons redeemed by individuals at businesses 1040 located in the vicinity of the corral 1050), the number of applications downloaded to mobile devices 1220 via interaction with a corral 1050, statistical information related to social networks (e.g., the number of "Likes" or followers that resulted from interacting with the corral 1050), the number of times an individual accessed a website as a result of interacting with a corral 1050 or any other information that may be useful to determining the success of an advertising campaign.

In certain embodiments, the campaign monitoring information that is made available to users may indicate how many mobile devices 1020 interacted with a particular corral 1050 or set of corrals 1050, as well as the number of purchases or revenue which directly attributed to the interactions (e.g., purchases or revenue derived from in-stores purchases for businesses located in the vicinity of a corral 1050, purchases made by directing an individual to a website or purchases made directly through the NFC component 1030). For example, if the NFC component of the corral 1050 is configured to provide a coupon for a product or service that is provided by a user (e.g., which may be associated with a business 1040 in the vicinity of the corral 1050), the user may determine how many of the coupons were redeemed to determine the purchases or revenue which resulted directly from interacting with the corrals 1050. Likewise, if the NFC component of the corral 1050 is configured to receive payments for products or services that are advertised on the panels 1030 of the corrals, any payment submitted through the corral can be tracked and utilized to determine the purchases or revenue which resulted directly from individuals interacting with the corral 1050.

In certain embodiments, the advertisements displayed on the advertisement panels 1030 may be targeted to particular individuals 1010 based on previous purchases made by the individuals 1010. For example, in response to the individual's interaction with the NFC component of the corral 1050, an individual's prior purchase history may be retrieved from or analyzed by the server 1220 to determine advertisements that are likely to be of interest to the individual 1010. The advertisements may be provided to the user via an advertisement panel 1030 of the corral or via the individual's mobile device 1020.

When a user accesses an advertising account (e.g., by logging into the server 1220), interfaces may be displayed to the user that permit the user to target advertisements to individuals 1010 based on demographic factors and/or purchase history. For example, advertisements can be targeted to individuals based on age, sex, income, prior purchases, location, job, marital status, etc. For example, a user can specify that certain advertisements are only to be displayed to males (e.g., advertisements relating to sporting goods), while other types of advertisements are only be displayed to females (e.g., advertisements relating to women's clothing). Other types of targeted advertising criteria may also be utilized.

The campaign monitoring information can be aggregated and processed in various ways to assist the user in running a successful advertising campaign. For example, the campaign monitoring information from all the corrals 1050 in a particular shopping center 1000 or a particular geographic area can be aggregated to provide the user with information that indicates the success of an advertising campaign in a particular shopping center 1000 or particular geographic area. Likewise, the campaign monitoring information can be aggregated according to particular products or services that are advertised using the corrals 1050. Thus, a user can view the success of an advertising campaign for particular products and services.

It should be apparent from the discussion provided above that the campaign monitoring information permits the users to make informed decisions about advertising campaigns. For example, upon analyzing the campaign monitoring information, a user can make informed decisions about whether to advertise in particular shopping centers 1000 or geographic areas or whether to advertise particular products or services. A user can easily optimize an advertising campaign and determine an efficient allocation of resources for the campaign.

In addition to the discussion provided above, the account associated with a user may also permit a user to configure the advertisements that are displayed by the corrals 1050 and to configure the functionality of the NFC components 1035 of the corrals 1050. For example, a user may utilize an advertiser device 1230 to upload advertisements (e.g., in the form of images, videos, animations, audio files or other digital data) to the server 1220. The advertisements may be pushed to, or retrieved by, the corrals 1050 and displayed on the advertisement panels 1030 of the corrals 1030.

Likewise, a user can configure the operation of the NFC components 1035 included in the corrals 1050 to provide or facilitate certain types of promotional functions. For example, the user can configure the NFC components 1035 to provide coupons to mobile devices 1220, display websites on mobile devices 1220, execute particular applications (e.g., web browsers, application stores or applications for determining an individual's location) on mobile devices 1220, accept purchases from individuals who interact with the NFC component 1035 of the corral, establish a connection between a mobile device 1220 and a network (e.g., Wi-Fi or Bluetooth™ network) provided in the vicinity of the corral, update loyalty points for a mobile device, display profile information for an individual 1010 on the advertisement panel 1030 of a corral 1050, or to perform other promotional functions.

In certain embodiments, the interfaces displayed to a user via the advertiser device 1230 may provide a list of functions that may be selected by the user for programming or configuring the NFC component of a corral 1050. For example, a user may select one or more functions from the list and associate the functions with one or more advertisements. By associating the function with an advertisement, the NFC component 1035 of a corral may be configured to perform the function whenever the advertisement is displayed by the corral 1050. In certain embodiments, the interfaces displayed to the user may also permit the user to select particular corrals 1050, shopping centers 1000 or geographic areas that are to display the advertisements.

It should be noted that the system in FIG. 12 is merely meant to demonstrate an embodiment of an operating environment that can be utilized in conjunction with the principles taught herein, and should not be construed as limiting in any manner whatsoever. The particular configuration in FIG. 12 can be altered in numerous ways without departing from the principles herein. For example, although FIG. 12 depicts a single server 1220 connected to three corrals 1050 and two advertiser devices 1230, any number of servers 1220, corrals 1050 and/or advertiser devices 1230 may be utilized with the system. Furthermore, while the exemplary system in FIG. 12 utilizes a server 1220 to store various types of information and to facilitate communication between the advertiser devices 1230 and the corrals 1050, it should be recognized the server 1220 may be omitted from the system and that the advertiser devices 1230 may communicate directly with the corrals (e.g., possibly in embodiments in which the network 1210 represents a local area network). Additional modifications can be made to the system 1200 illustrated in FIG. 12 without departing from the scope of the present invention.

Figure 13:
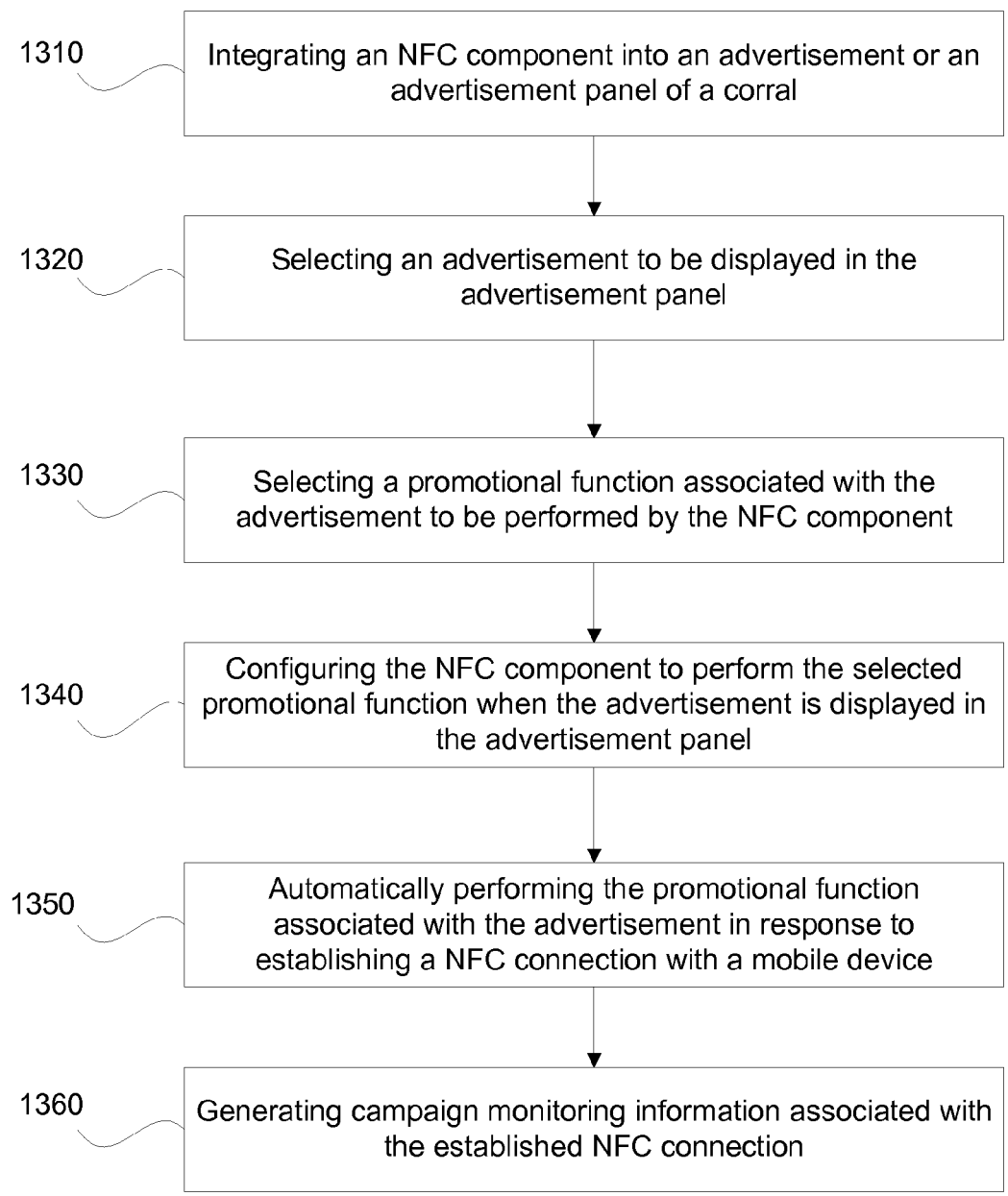
FIG. 13 illustrates a flow chart of a method for associating a promotional function with an advertisement that is displayed on a NFC-enabled corral in accordance with certain embodiments of the present invention.

FIG. 13 is a flow chart illustrating a method 1300 for associating a promotional function with an advertisement that is displayed on a NFC-enabled corral 1050 in accordance with certain embodiments of the present invention. Initially, a NFC component 1035 is integrated into an advertisement or advertisement panel 1030 of a corral 1050 (step 1310). It should be recognized that the NFC component 1035 may be integrated into other parts of the corral 1050 as well. Next, an advertisement is selected to be displayed in the advertisement panel (step 1320). In the case that the advertisement panel 1030 of the corral 1050 includes an electronic display, this may include selecting a multimedia item (e.g., image, video, or animation) to be displayed on the electronic display. In certain embodiments, a user may select the advertisement by uploading the advertisement with an advertiser device 1230 to a server 1220 and distributing the advertisement to a corral 1050 over a network 1210. In some embodiments, the advertisement may be a physical advertisement (e.g., made of paper, cardboard or similar material) which can be inserted into the advertisement panel 1030.

A promotional function associated with the advertisement is selected (step 1330). The promotional function represents a function that is to be performed by the NFC component 1035. As discussed above, exemplary promotional functions may include transferring data (e.g., coupons, promotions or applications) to a mobile device 1020, executing applications (e.g., web browsers or application marketplace) on a mobile device 1230, accessing websites, updating loyalty card information associated with an individual 1010, establishing a connection with an available network (e.g., connect to a Bluetooth™ or Wi-Fi network in the vicinity of the corral), subscribing to a mailing list, updating settings on the mobile device 1020, sending a text message or e-mail, downloading or launching an application, receiving or processing a payment or interacting with a social media application or website. The NFC component 1035 may perform other types of promotional functions as well. As explained above, a user may utilize an advertiser device 1230 to select the promotional function that is performed by the NFC component 1035 in certain embodiments.

Next, the NFC component 1035 of the corral 1050 is configured to perform the selected function when the advertisement is displayed in the advertisement panel 1030 of the corral 1050 (step 1340). The selected promotional function is automatically performed in response to establishing a NFC connection between the mobile device 1020 and the NFC component of the corral 1050 (step 1350). The connection between the mobile device 1020 and the NFC component of the corral 1050 may be established when the mobile device 1020 contacts the NFC component 1035 or when the mobile device 1020 is placed in close proximity to the NFC component 1035. The connection may be established in an active communication mode or a passive communication mode.

Campaign monitoring information associated with the established NFC connection may be generated in response to establishing the connection between the NFC component of the corral 1050 and the mobile device 1020 (step 1360). In certain embodiments, the campaign monitoring information may be transmitted over a network 1210 to a server 1220 and made accessible to a user for review. As explained above, the campaign monitoring information may be utilized by the user to make intelligent decisions regarding an advertising campaign.

Figure 14:
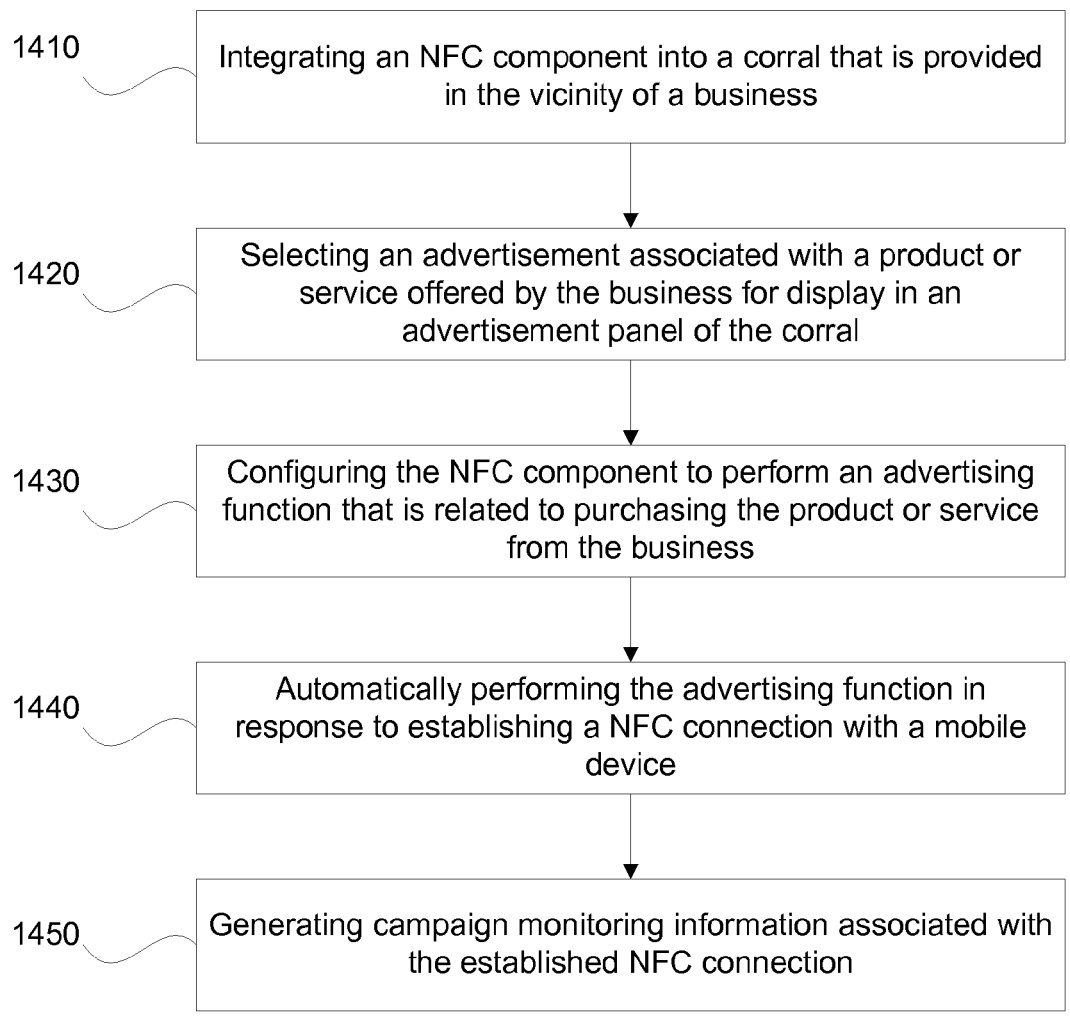
FIG. 14 illustrates a flow chart of a method for providing a promotional function through a NFC-enabled corral that is associated with a product or service that is offered by a business located in the vicinity of the corral in accordance with certain embodiments of the present invention.

FIG. 14 is a flow chart illustrating a method 1400 for providing a promotional function though a NFC-enabled corral 1050 that is associated with a product or service being offered by a business 1040 located in the vicinity of the corral 1050 in accordance with certain embodiments of the present invention. Initially, a NFC component 1035 is integrated into a corral 1050 located in the vicinity of a business (step 1410). As explained above, the NFC component may be integrated into the advertisement panels 1030, advertisements, walls 1050 or other portions of the corral. The corral 1050 may be located in a shopping center 1000 associated with the business 1040. In certain embodiments, the corral 1050 may be located in a parking lot outside the business 1040. In certain embodiments, the corral 1050 may be located inside the same building as the business 1040 (e.g., in the actual business or in the same mall as the business) or immediately outside the business 1040.

An advertisement associated with a product or service that is offered by the business 1040 is selected for display in the advertisement panel 1030 of the corral (step 1420). In certain embodiments, the advertisement may be a digital advertisement that is selected by a user with an advertiser device 1230 and which is transmitted to the corral 1050 over a network 1210. In certain embodiments, the advertisement may be a physical or hard copy advertisement (e.g., comprised of paper, cardboard or other similar material).

The NFC component 1035 integrated into the corral 1050 may be configured to perform a promotional function that is related to purchasing or promoting the product or service offered by the business 1040 (step 1430). As explained above, the promotional function may include any function that is related to, or associated with, the business 1040. For example, the promotional function may transfer a coupon or other promotion to a mobile device 1020 of an individual 1010, thus permitting the individual to purchase the product or service from the business at a discounted price. Other types of exemplary promotional functions associated with the business 1040 may include functions for displaying a website of a business (e.g., which may include information about a product or service being offered by the business or about the business itself), adding products or services offered by the business to a digital shopping list on the mobile device 1020, adding products or services sold by the business to a shopping cart on the mobile device 1020 to enable purchase of the items from the business 1040, enabling direct purchase of a product or service offered by the business 1040 by interacting with the NFC component, or displaying a list of products or services offered by the business 1040 that are on sale for a particular day or time period.

The promotional function associated with the business 1040 may automatically be performed in response to establishing a NFC connection with a mobile device 1020 of an individual 1010 (step 1440). Campaign monitoring information associated with the established NFC connection may be generated in response to establishing the connection between the NFC component of the corral 1050 and the mobile device 1020 (step 1360). This information may be utilized by a user to assess the effectiveness of an advertising campaign.

Although the invention has been described with reference to specific embodiments, it will be understood by those skilled in the art that various changes may be made without departing from the spirit or scope of the invention. For example, it will be readily apparent that enclosure 110 can have various designs, components, portions, and/or shapes, not shown in the figures. Accordingly, the disclosure of embodiments is to be illustrative of the scope of the invention and is not intended to be limiting. It is intended that the scope of the invention shall be limited only to the extent required by the appended claims. To one of ordinary skill in the art, it will be readily apparent that the shopping cart corral, the apparatus and method of providing discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A corral configured to hold one or more shopping carts and display one or more advertisements, the corral comprising:
    an enclosure defined by three members and having an opening configured to receive the one or more shopping carts;
    a first panel coupled to a first one of the three members, the first panel being adjacent to the opening of the enclosure and configured to display one or more advertisements;
    a second panel coupled to a second one of the three members, the second panel being adjacent to the opening of the enclosure and configured to display one or more advertisements, the third member being coupled to the other two members which are substantially parallel to each other; and
    a near field communication component being integrated into the corral and being configured to:
        establish a connection with a mobile device in response to the mobile device being placed in proximity to the near field communication component;
        communicate with the mobile device via the established connection; and
        execute a promotional function associated with the one or more advertisements displayed in either the first panel or the second panel, wherein the promotional function causes promotional content to be transferred to the mobile device;
    wherein the second member is shorter than the first member and the first panel and second panel are provided in a staggered arrangement, and the corral further comprises a bar member that is coupled to, and extends through, the first panel and second panel so as to further couple the corral near the opening of the enclosure, wherein the bar member is coupled to portions of the first panel and second panel such that the bar member is situated at an angle that is not parallel with respect to the third member.

2. The corral of claim 1, wherein the promotional content is selected from the group consisting of a coupon, offer, application and media file.

3. The corral of claim 1, wherein the near field communication component is configured to transmit location information which identifies a network location for the promotional content over the established connection to the mobile device to enable retrieval of the promotional content by the mobile device.

4. The corral of claim 1, wherein the near field communication component is configured to transmit the promotional content directly to the mobile device over the established connection.

5. The corral of claim 1, wherein the promotional content comprises a coupon that can be redeemed at a business located in a vicinity of the corral.

6. The corral of claim 1, further comprising circuitry configured to establish a network connection that enables communications with a remote server and wherein data received at the corral via the network connection enables the dynamic updating of the promotional function executed by the near field communication component and the one or more advertisements displayed by either the first panel or the second panel.

7. The corral of claim 6, wherein the network connection further enables the promotional content to be updated dynamically.

8. The corral of claim 1, wherein campaign monitoring information is generated in response to establishing the connection with the mobile device and the campaign monitoring information is made accessible to a user over a network.

9. The corral of claim 8, wherein the campaign monitoring information is stored on a server and made accessible to advertisers via a website, the campaign monitoring information comprising information relating to interactions between mobile devices associated with customers and the near field communication component integrated into the corral including information associated with the one or more advertisements displayed by the corral and the promotional content that is made accessible via the near field communication component.

10. The corral of claim 1, wherein the near field communication component is integrated into the first panel or the second panel.

11. The corral of claim 1, further comprising circuitry configured to customize the one or more advertisements that are displayed to an individual based on the individual's previous purchase history.

12. A corral configured to hold one or more shopping carts and display one or more advertisements, the corral comprising:
  an enclosure having an opening configured to receive the one or more shopping carts, wherein the enclosure is defined by a first member, second member and third member, the third member being coupled to the other two members which are substantially parallel to each other and the second member being shorter than the first member such that the first panel and second panel are provided in a staggered arrangement;
  at least one advertisement panel coupled to the enclosure and configured to display an advertisement; and
  a near field communication component configured to:
    establish a connection with a mobile device in response to the mobile device being placed in proximity to the near field communication component;
    communicate with the mobile device via the established connection; and
    execute a promotional function for a product or service offered for sale by a business that is located in a vicinity of the corral, wherein the promotional function causes promotional content associated with product or service to be transferred to the mobile device;
  wherein the corral further comprises a bar member that is coupled to, and extends through, the at least one advertisement panel to further couple the corral near the opening of the enclosure, wherein the bar member is coupled to the at least one advertisement panel.

13. The corral of claim 12, wherein the near field communication component is configured to transmit location information which identifies a network location for the promotional content over the established connection to the mobile device to enable retrieval of the promotional content by the mobile device.

14. The corral of claim 12, wherein the near field communication component is configured to transmit the promotional content directly to the mobile device over the established connection.

15. The corral of claim 12, wherein the promotional content comprises a coupon that can be redeemed at the business.

16. The corral of claim 12, further comprising circuitry configured to establish a network connection that enables communications with a remote server and wherein data received at the corral via the network connection enables the dynamic updating of the promotional function executed by the near field communication component and the advertisement displayed by the at least one advertisement panel.

17. The corral of claim 12, wherein campaign monitoring information is generated in response to establishing the connection with the mobile device and the campaign monitoring information is made accessible to a user over a network.

18. The corral of claim 17, wherein the campaign monitoring information is stored on a server and made accessible to advertisers via a website, the campaign monitoring information comprising information relating to interactions between mobile devices associated with customers and the near field communication component integrated into the corral including information associated with the advertisement displayed by the corral and the promotional content that is made accessible via the near field communication component.

19. The corral of claim 12, wherein the near field communication component is integrated into the at least one advertisement panel.

20. The corral of claim 12, wherein the near field communication component is integrated into the advertisement.

21. The corral of claim 12, further comprising circuitry configured to customize the advertisement that is displayed to an individual associated with the mobile device.

22. The corral of claim 12, wherein the promotional content can be utilized to obtain the product or service for a discounted price at the business.

* * * * *